(12) United States Patent
Yokoyama et al.

(10) Patent No.: US 10,473,367 B2
(45) Date of Patent: Nov. 12, 2019

(54) HEAT PUMP APPARATUS

(71) Applicant: MITSUBISHI ELECTRIC CORPORATION, Chiyoda-ku (JP)

(72) Inventors: Tetsuhide Yokoyama, Chiyoda-ku (JP); Yosuke Shinomoto, Chiyoda-ku (JP); Shogo Moroe, Chiyoda-ku (JP); Akira Satake, Chiyoda-ku (JP); Masashi Fujitsuka, Chiyoda-ku (JP); Takeshi Mori, Chiyoda-ku (JP); Taro Kato, Chiyoda-ku (JP); Hideaki Maeyama, Chiyoda-ku (JP); Keiko Tada, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 176 days.

(21) Appl. No.: 14/891,903

(22) PCT Filed: May 21, 2014

(86) PCT No.: PCT/JP2014/063521
§ 371 (c)(1),
(2) Date: Nov. 17, 2015

(87) PCT Pub. No.: WO2014/189093
PCT Pub. Date: Nov. 27, 2014

(65) Prior Publication Data
US 2016/0084546 A1 Mar. 24, 2016

(30) Foreign Application Priority Data
May 24, 2013 (JP) .................. 2013-109693

(51) Int. Cl.
*F25B 30/02* (2006.01)
*F04C 23/00* (2006.01)
(Continued)

(52) U.S. Cl.
CPC ............ *F25B 30/02* (2013.01); *F04C 23/001* (2013.01); *F04C 28/02* (2013.01); *F25B 31/026* (2013.01)

(58) Field of Classification Search
CPC ........ F25B 1/02; F25B 49/022; F25B 31/026; F25B 30/02; F04C 23/008; F04C 28/08;
(Continued)

(56) References Cited

U.S. PATENT DOCUMENTS 4,519,750 A   5/1985   Kurahashi et al.
4,544,333 A   10/1985  Hirano
(Continued)

FOREIGN PATENT DOCUMENTS

CN   102691660 A   9/2012
JP   55-180908 U   6/1979
(Continued)

OTHER PUBLICATIONS

"Machine Translation of JP H07-190527, Fujitaka, Jul. 1995".*
(Continued)

*Primary Examiner* — Frantz F Jules
*Assistant Examiner* — Martha Tadesse
(74) *Attorney, Agent, or Firm* — Oblon, McClelland, Maier & Neustadt, L.L.P.

(57) ABSTRACT

A heat pump apparatus, including: a two-cylinder compressor including: an electric motor; two compression units to be driven by the electric motor, the two-cylinder compressor being structured to switch between two operation modes including single operation in which one of the compression units is brought into a non-compression state, and parallel operation in which both the compression units are brought into a compression state; an inverter drive control device supplying drive power to the electric motor of the two-cylinder compressor; an operation mode detecting-determin-
(Continued)

ing unit determining a current operation mode based on an electric signal acquired from the inverter drive control device; and a capacity control device determining a rotating frequency of the electric motor so that a temperature of a target object is brought close to a set value, to thereby control the inverter drive control device based on a result of determination of the operation mode detecting-determining unit.

11 Claims, 13 Drawing Sheets

(51) Int. Cl.
 *F04C 28/02* (2006.01)
 *F25B 31/02* (2006.01)
(58) Field of Classification Search
 CPC ...... F04C 18/356; F04C 28/02; F04C 28/065; F04C 2270/86
 See application file for complete search history.

(56) References Cited

U.S. PATENT DOCUMENTS

| | | | | |
|---|---|---|---|---|
| 5,013,217 A * | 5/1991 | Hitosugi | ............... | F04C 23/001 417/26 |
| 5,094,085 A * | 3/1992 | Irino | ................. | F04C 18/3564 62/175 |
| 6,276,148 B1 * | 8/2001 | Shaw | ....................... | F04B 9/04 237/2 B |
| 6,619,062 B1 | 9/2003 | Shibamoto et al. | | |
| 7,332,882 B2 * | 2/2008 | Aoyagi | ..................... | H02J 7/14 318/139 |
| 7,409,833 B2 * | 8/2008 | Unger | ....................... | F25B 1/02 417/254 |
| 7,563,085 B2 * | 7/2009 | Sakaniwa | ........... | F01C 21/0845 418/11 |
| 7,985,054 B2 * | 7/2011 | Ogasawara | ......... | F01C 21/0845 417/212 |
| 8,084,976 B2 * | 12/2011 | Hashimoto | ......... | H02P 21/0003 318/400.02 |
| 9,240,737 B2 * | 1/2016 | Sakae | ................ | H02M 3/1584 |

FOREIGN PATENT DOCUMENTS

| | | | |
|---|---|---|---|
| JP | 55-180989 U | | 6/1979 |
| JP | 57-159979 A | | 10/1982 |
| JP | 59-113279 A | | 6/1984 |
| JP | 60-113084 A | | 6/1985 |
| JP | 61-159691 U | | 10/1986 |
| JP | 01-247786 A | | 10/1989 |
| JP | 04-006349 U | | 1/1992 |
| JP | 04-048164 A | | 2/1992 |
| JP | 07190527 A | * | 7/1995 |
| JP | 07190527 A | * | 7/1995 |
| JP | 2001-165073 A | | 6/2001 |
| JP | 2007-64016 A | | 3/2007 |
| JP | 2010-71264 A | | 4/2010 |

OTHER PUBLICATIONS

Extended European Search Report dated Dec. 7, 2016 in Patent Application No. 14801598.5.
Koji Hirano "Development of a New Mechanism for Dual Rotary Compressor" International Compressor Engineering Conference, 2012, Paper 2107, http://docs.lib.purdue.edu/icec/2107, (8 pages).
International Search Report dated Aug. 26, 2014 for PCT/JP2014/063521 filed on May 21, 2014.

* cited by examiner (a) FIRST COMPRESSION UNIT 10

(b) SECOND COMPRESSION UNIT 20

NON-COMPRESSION STATE (REST STATE)

(a) TOP VIEW (b) SIDE VIEW

VANE IS PRESSED AND URGED    $F-(P_d-P_s)A<0$

VANE IS SEPARATED    $F-(P_d-P_s)A>0$

REST STATE IS MAINTAINED    $F+\Delta F-(P_d-P_s)A>0$

RETENTION IS CANCELED    $F+\Delta F-(P_d-P_s)A<0$ (a) <TORQUE FLUCTUATION DURING SINGLE OPERATION>

(b) <TORQUE FLUCTUATION DURING PARALLEL OPERATION>

HEAT PUMP APPARATUS

TECHNICAL FIELD

The present invention relates to a heat pump apparatus using a compressor including two cylinders or two compression units.

BACKGROUND ART

Hitherto, in a heat pump apparatus such as an air-conditioning apparatus or a water heater, a vapor-compression refrigeration cycle using a refrigerant compressor is generally employed. That is, the vapor-compressor refrigeration cycle constructed by connecting the refrigerant compressor, a condenser, a pressure reducing unit, and an evaporator to each other through pipes is installed in the heat pump apparatus, thereby being capable of carrying out operation in accordance with intended use (such as air-conditioning use and hot water supply use).

Incidentally, in recent years, regulations on greenhouse gas emission were incorporated in the Kyoto Protocol in 1997 from the viewpoint of preventing global warming, and the Kyoto Protocol came into force as international law in 2005. In order to reduce the amount of carbon dioxide emission and achieve energy saving, in the field of HVAC, the heat pump apparatus has widely been spread in place of conventional water heaters and conventional room heaters, and efficiency of the heat pump apparatus has further been increased.

Regulations on energy saving of air-conditioning apparatus have been tightened in each country. In particular, as compared to the conventional standards, the latest standards have such a feature that energy-saving performance is evaluated under an operation condition closer to an actual load. Conventionally, in Japan, when indicating energy-saving performance, efficiency evaluation was indicated by a cooling-heating average coefficient of performance (COP) under a rated condition. Since 2011, the efficiency evaluation has been indicated by an annual performance factor (APF) calculated based on COPs under four cooling-heating conditions including a medium condition. In addition, in Europe, since 2012, there has been adopted a method of indicating energy-saving performance based on new standards for evaluating and calculating a seasonal energy efficiency ratio (SEER) of cooling and a seasonal coefficient of performance (SCOP) of heating under four cooling conditions and four heating conditions added to a low-load condition.

In this case, the low-load condition refers to a condition that a temperature difference between an outside temperature and an indoor temperature is small and a small quantity of heat is necessary for keeping the indoor temperature constant. The low-load condition also refers to a state in which a difference between a high pressure (Pd) and a low pressure (Ps) is small in the vapor-compressor refrigeration cycle and a small quantity of heat is necessary in a steady state (for example, 25% or less of rated capacity). Except for start of operation, about 10% to 50% of capacity under a rated condition is needed during steady operation, and a time period of operation in a range of from the low-load condition to the medium condition is longer than that of the rated operation. Accordingly, when substantially evaluating annual energy-saving performance, it is a new challenge to increase a COP in the low-load condition that is out of evaluation in the conventional standards.

Further, hitherto, ON-OFF control has been employed as a measure to adjust cooling or heating capacity, but has a problem in that a fluctuation range of temperature adjustment is wide and a vibration noise level is high, and another problem in that an energy loss is significant. In order to solve the problems, inverter control of varying a rotation speed of a drive motor of a compressor has widely been spread.

In recent years, the air-conditioning apparatus has been required to reduce a startup time period and to have increased heating capacity under a low-outside-temperature environment, and has been needed to have rated capacity with a certain level or more. On the other hand, houses are being highly air-tightened and heat-insulated, thereby reducing capacity necessary during the steady operation, and enlarging an operation capacity range. Accordingly, the air-conditioning apparatus is required to maintain high efficiency in a wider operation range and a wider rotation speed range, thereby being difficult to maintain high efficiency in operation performed at low speed and low-load capacity simply by employing control of the rotation speed performed by the related-art inverter.

In this context, a refrigerant compressor taking a measure to mechanically vary a displacement volume (mechanical volume control) comes into focus again. For example, in Patent Literature 1, there is disclosed such a configuration that in a rotary compressor of a two-cylinder rolling piston type, one of compression units is brought into a non-compression state under a low load, thereby halving a flow rate of circulation of refrigerant. In this configuration, operation can be carried out without reducing a rotation speed of an electric motor. Thus, efficiency of the compressor can be increased. As a specific measure, there is disclosed such a measure that when one of the compression units is brought into the non-compression state, a high pressure is led into one of cylinder chambers, and a pressure in a back pressure chamber on a blade (vane) back surface is changed to a medium pressure so that the blade (vane) is separated away from a rolling piston due to a pressure difference between the high pressure and the medium pressure, thereby bringing one of the compression units into the non-compression state (rest cylinder operating method).

Further, in Patent Literature 2, there is disclosed a configuration of a refrigeration cycle apparatus including a switching unit and a control unit for switching and controlling operation between single operation in which one of two compression units is brought into a non-compression state, and parallel operation in which both the two compression units are brought into a compression state in the two-cylinder (synonymous with a two-cylinder type) rotary compressor as disclosed in Patent Literature 1. The refrigeration cycle apparatus has a feature of including the control unit for controlling, based on an output frequency of an inverter circuit, switching performed by the switching unit, and for varying a point of the switching based on a temperature of a condenser of a refrigeration cycle.

Further, in Patent Literature 3, there is disclosed a multi-cylinder rotary compressor that accommodates an electric element in a closed shell having a high-pressure interior, and also accommodates therein a plurality of compression units to be driven by the electric element. As disclosed in Patent Literature 3, a tension spring for pulling the vane outward is arranged on a back surface side of a vane of at least one of the plurality of compression units, and another spring for pressing the vane inward is arranged on a back surface side (rear end portion side) of a vane of another one of the compression units. At the time of startup, a pressure difference between a discharge pressure and a suction pressure is small. Thus, on the compression unit side including the tension spring arranged on the vane, a pulling force of the tension spring is larger than a force for pressing the vane inward. That is, the pulling force of the tension spring overcomes the force for pressing the vane inward, and the vane is separated away from a rolling piston and brought into a non-compression state. This technology aims to secure a long period of time for light-load operation at the time of startup, to thereby perform startup gently and smoothly.

CITATION LIST

Patent Literature

Patent Literature 1: Japanese Unexamined Patent Application Publication No. Hei 1-247786 (page 3, FIG. 1, and FIG. 2)
Patent Literature 2: Japanese Unexamined Patent Application Publication No. Hei 4-6349 (page 5, FIG. 1 to FIG. 3)
Patent Literature 3: Japanese Unexamined Utility Model Application Publication No. Sho 61-159691 (page 4, page 5, FIG. 1 to FIG. 3)
Patent Literature 4: Japanese Unexamined Utility Model Application Publication No. Sho 55-180989
Patent Literature 5: Japanese Unexamined Patent Application Publication No. Sho 60-113084

SUMMARY OF INVENTION

Technical Problem

In the two-cylinder rotary compressor disclosed in Patent Literature 1 or Patent Literature 2, in order to bring one of the compression units into the non-compression state at the time of a low load, that is, in order to switch a pressure applied to the rear end portion of the vane, it is necessary that the switching unit such as an electromagnetic four-way valve, pipes for leading the switched pressure, and other members be arranged outside the closed shell. The two-cylinder rotary compressor disclosed in Patent Literature 1 or Patent Literature 2 needs the arrangement of the switching unit and the pipes as described above, which leads to a problem of increased size and cost as compared to a related-art two-cylinder rotary compressor.

In a case of the two-cylinder rotary compressor disclosed in Patent Literature 3, at the time of startup, due to pressure reduction at the rear end portion of the vane, the force for pressing the vane inward is smaller than the pulling force exerted by the tension spring so that the vane is separated away from the rolling piston to be brought into the non-compression state. That is, in the case of the two-cylinder rotary compressor disclosed in Patent Literature 3, operation can be automatically switched between the compression state and the non-compression state without using the pipes arranged outside the closed shell as disclosed in Patent Literature 1 or Patent Literature 2. The two-cylinder rotary compressor disclosed in Patent Literature 3 is effective in this regard.

However, the technology of Patent Literature 3 originally aims to slightly moderate sharp pressure rise and load increase at the time of startup. Thus, no investigation is conducted on stable control of both the single operation and the parallel operation. That is, there is a problem in that an operation mode cannot be stably controlled.

When switching the operation mode between the single operation and the parallel operation, the two-cylinder rotary compressor needs to control the output frequency of the inverter circuit in accordance with the operation mode so as not to change capacity of the two-cylinder rotary compressor. Accordingly, in order to stably control the operation mode, it is necessary to determine whether the current operation mode is the single operation or the parallel operation, but no investigation is conducted on this point in Patent Literature 3.

The present invention has been made in view of the above-mentioned matters, and has an object to attain a heat pump apparatus capable of determining whether a current operation mode is single operation or parallel operation, and of stably controlling the operation mode.

Solution to Problem

According to one embodiment of the present invention, there is provided a heat pump apparatus, including: a two-cylinder compressor including: an electric motor; and two compression units to be driven by the electric motor, the two-cylinder compressor being structured to switch between two operation modes including single operation in which one of the two compression units is brought into a non-compression state, and parallel operation in which both the two compression units are brought into a compression state; a heat-rejecting-side heat exchanger; a pressure reducing mechanism; a heat-removing-side heat exchanger, the two-cylinder compressor, the heat-rejecting-side heat exchanger, the pressure reducing mechanism, and the heat-removing-side heat exchanger being connected to each other; an inverter drive control device for supplying drive power to the electric motor of the two-cylinder compressor; an operation mode detecting-determining unit for determining a current operation mode based on an electric signal acquired from the inverter drive control device; and a capacity control device for determining a rotating frequency of the electric motor based on a result of determination of the operation mode detecting-determining unit so that a temperature of a target object is brought close to a set value, to thereby control the inverter drive control device.

Advantageous Effects of Invention

According to the one embodiment of the present invention, it is possible to attain the heat pump apparatus capable of determining whether the current operation mode is the single operation or the parallel operation, and of stably controlling the operation mode.

BRIEF DESCRIPTION OF DRAWINGS

FIG. 9 are graphs showing torque fluctuations in the two-cylinder rotary compressor 100 of FIG. 7, in which FIG. 9(a) is a graph showing the torque fluctuation during single operation, and FIG. 9(b) is a graph showing the torque fluctuation during parallel operation.

FIG. 10 are graphs showing characteristics during the single operation when an electric motor 8 of the two-cylinder rotary compressor of FIG. 7 is a six-pole motor, in which FIG. 10(a) is a graph showing a current waveform of the motor, and FIG. 10(b) is a graph showing intensities of respective frequency components.

FIG. 11 are graphs showing characteristics during the parallel operation when the electric motor 8 of the two-cylinder rotary compressor 100 of FIG. 7 is a six-pole motor, in which FIG. 11(a) is a graph showing a current waveform of the motor, and FIG. 11(b) is a graph showing intensities of respective frequency components.

FIG. 12 are schematic side views of a retaining mechanism of a two-cylinder rotary compressor 100 arranged in a heat pump apparatus 200 according to Embodiment 2 of the present invention, in which FIG. 12(a) is a view illustrating a compression state, and FIG. 12(b) is a view illustrating a non-compression state (rest state).

FIG. 14 are graphs showing characteristics during the single operation of the two-cylinder rotary compressor 100 of FIG. 7, in which FIG. 14(a) is a graph showing a torque fluctuation waveform calculated based on a current, and FIG. 14(b) is a graph showing intensities of respective frequency components.

FIG. 15 are graphs showing characteristics during the parallel operation of the two-cylinder rotary compressor 100 of FIG. 7, in which FIG. 15(a) is a graph showing a torque fluctuation waveform calculated based on a current, and FIG. 15(b) is a graph showing intensities of respective frequency components.

DESCRIPTION OF EMBODIMENTS

Figure 1:
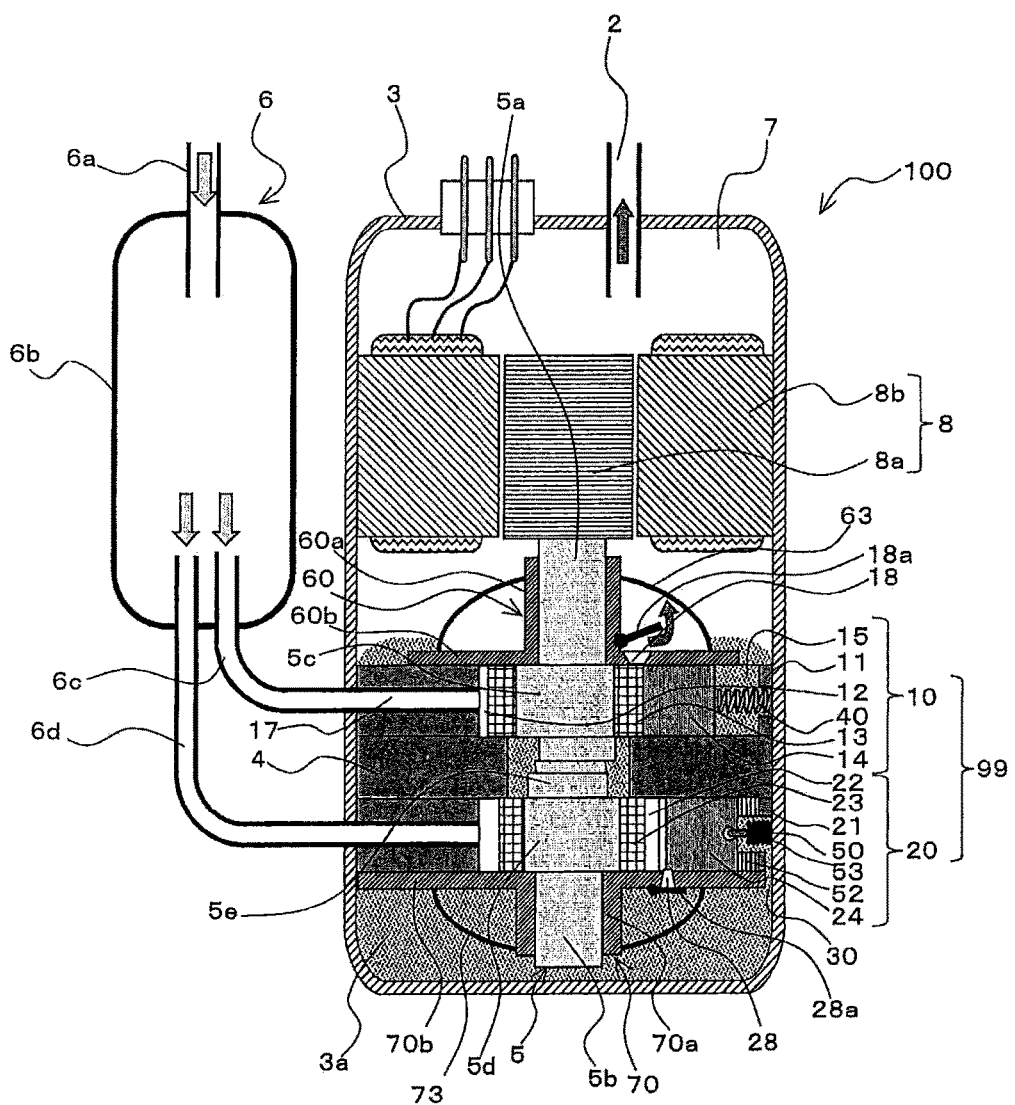
FIG. 1 is a schematic vertical sectional view of structure of a two-cylinder rotary compressor 100 arranged in a heat pump apparatus according to Embodiment 1 of the present invention, for illustrating a state in which a first compression unit 10 is brought into a steady compression state, and a second compression unit 20 is brought into a rest state.

Now, an example of a heat pump apparatus according to the present invention is described with reference to the drawings. In the following, a two-cylinder rotary compressor 100 arranged in the heat pump apparatus is first described. Note that, in the drawings described below, relationships in size between components are sometimes different from actual relationships. Further, three-dimensional positional relationships of discharge ports 18 and 28 and cylinder suction passages 17 and 27 do not necessarily match between vertical sectional views and horizontal sectional views.

Embodiment 1

[Configuration of Two-cylinder Rotary Compressor 100]

Figure 2:
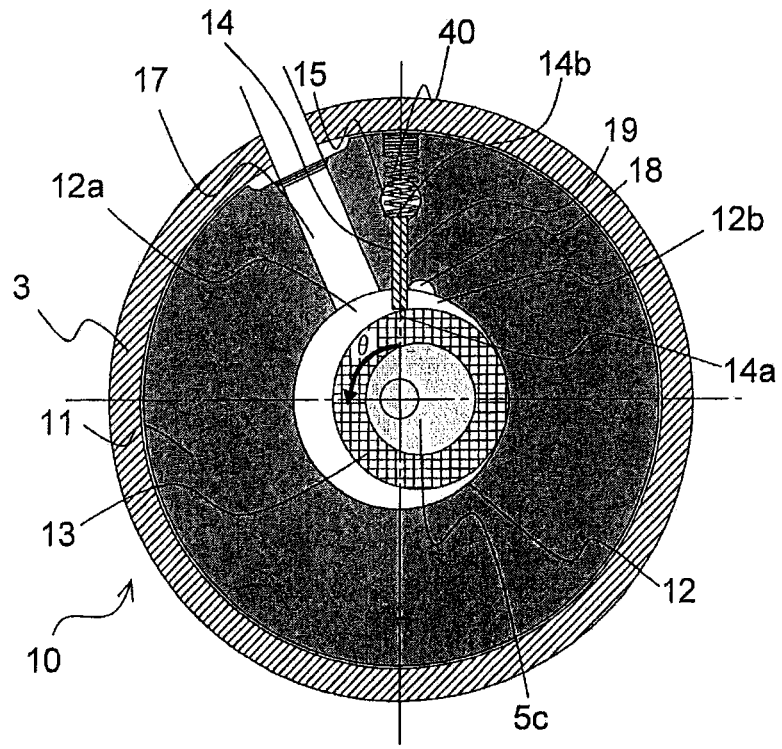
FIG. 2 are schematic horizontal sectional views illustrating the structure of the two-cylinder rotary compressor 100 of FIG. 1, in which FIG. 2(*a*) is a schematic horizontal sectional view illustrating the first compression unit 10, and FIG. 2(*b*) is a schematic horizontal sectional view illustrating the second compression unit 20.
Figure 2:
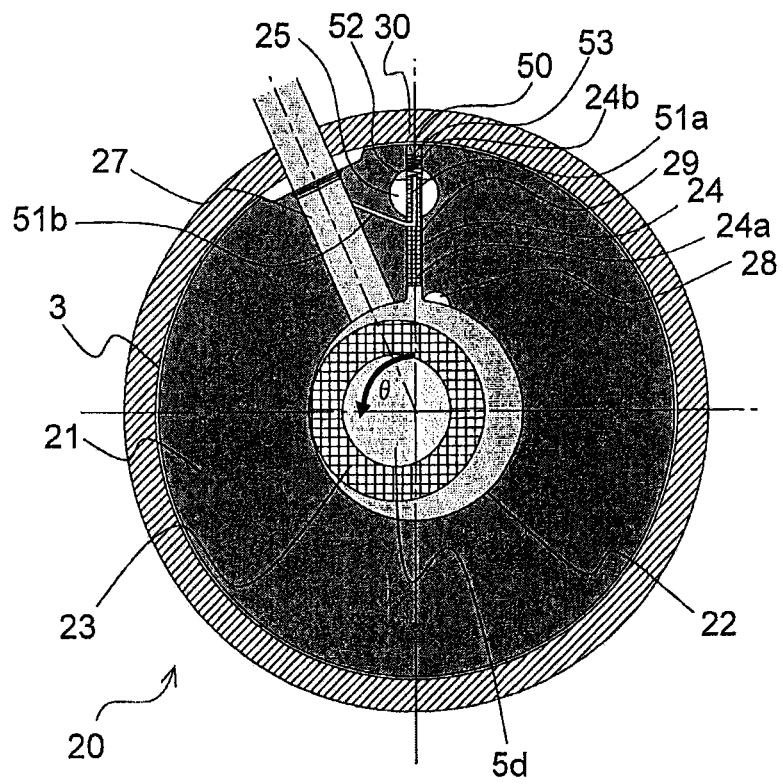

FIG. 1 is a schematic vertical sectional view of structure of the two-cylinder rotary compressor 100 arranged in a heat pump apparatus according to Embodiment 1 of the present invention, for illustrating a state in which a first compression unit 10 is brought into a steady compression state and a second compression unit 20 is brought into a rest state. Further, FIG. 2 are schematic horizontal sectional views illustrating the structure of the two-cylinder rotary compressor 100 of FIG. 1. FIG. 2(a) is a schematic horizontal sectional view illustrating the first compression unit 10, and FIG. 2(b) is a schematic horizontal sectional view illustrating the second compression unit 20. Note that, FIG. 1 and FIG. 2 are illustrations of the two-cylinder rotary compressor 100 in a state in which the first compression unit 10 is brought into a compression state and the second compression unit 20 is brought into a non-compression state (rest state).

Figure 3:
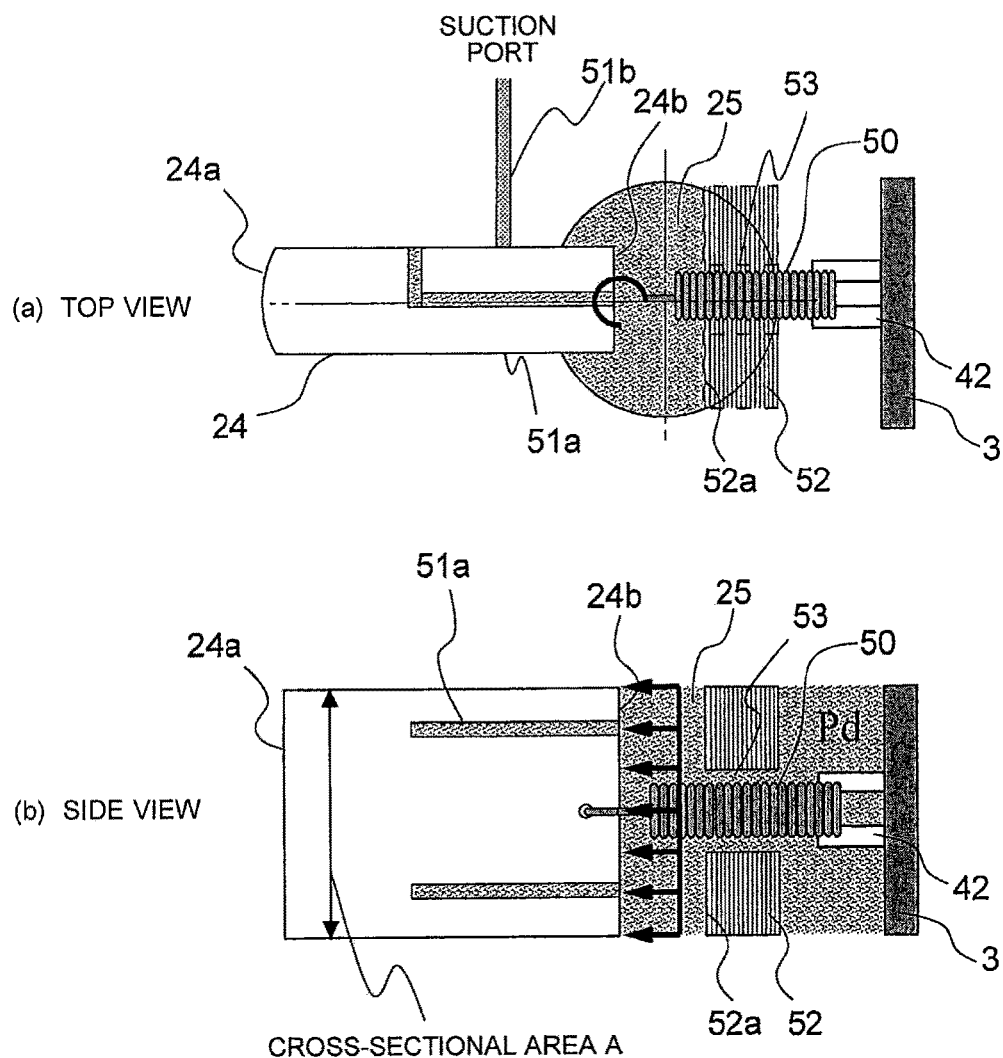
FIG. 3 are enlarged views illustrating a main part of a vicinity of a second vane 24 of the second compression unit 20 of the two-cylinder rotary compressor 100 of FIG. 1.
Figure 4:
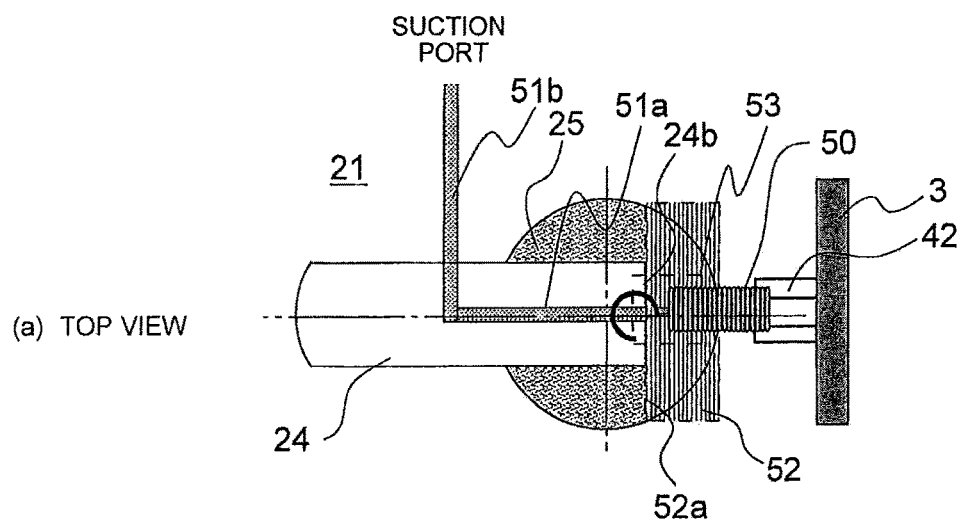
FIG. 4 are enlarged views illustrating a main part of the vicinity of the second vane 24 of the second compression unit 20 of the two-cylinder rotary compressor 100 of FIG. 1.
Figure 4:
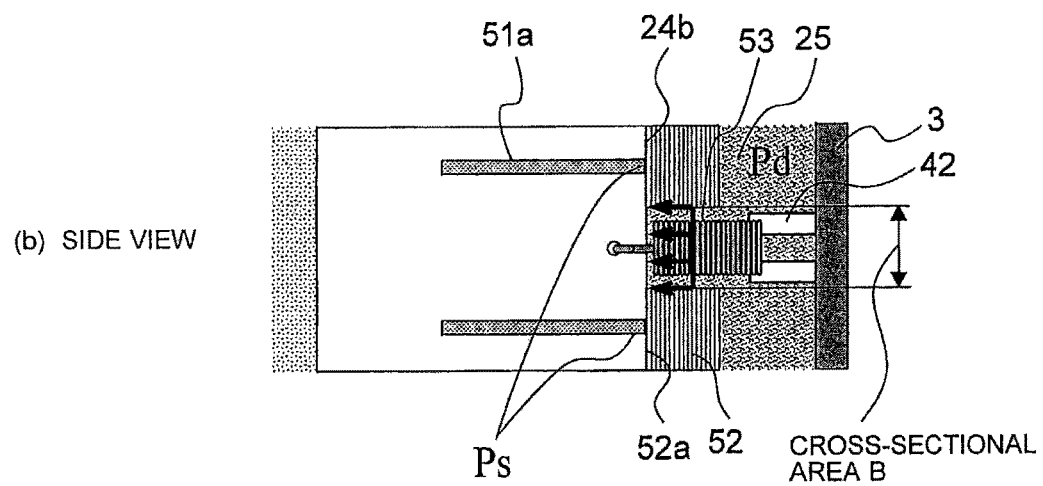

FIG. 3 and FIG. 4 are enlarged views illustrating a main part of a vicinity of a second vane 24 of the second compression unit 20 of the two-cylinder rotary compressor 100 of FIG. 1. Note that, FIG. 3 are views illustrating the vicinity of the second vane 24 in a state in which the second compression unit 20 performs refrigerant compressing action. FIG. 3(a) is a horizontal sectional view illustrating the vicinity of the second vane 24, and FIG. 3(b) is a vertical sectional view illustrating the vicinity of the second vane 24. Further, FIG. 4 are views illustrating the vicinity of the second vane 24 of the second compression unit 20 in the rest state (state in which the second compression unit 20 does not perform the refrigerant compressing action). FIG. 4(a) is a horizontal sectional view illustrating the vicinity of the second vane 24, and FIG. 4(b) is a vertical sectional view illustrating the vicinity of the second vane 24.

The two-cylinder rotary compressor 100 is one of components of a refrigeration cycle adopted in a heat pump apparatus such as an air-conditioning apparatus or a water heater. Further, the two-cylinder rotary compressor 100 has a function of sucking a fluid (such as refrigerant or a heating medium (water, antifreezing fluid, or other medium)), compressing the fluid into a high-temperature and high-pressure state, and then discharging the fluid.

In an internal space 7 of a closed shell 3 of the two-cylinder rotary compressor 100 according to Embodiment 1, the two-cylinder rotary compressor 100 includes a compression mechanism 99 including the first compression unit 10 and the second compression unit 20, and an electric motor 8 for driving the first compression unit 10 and the second compression unit 20 through a drive shaft 5.

The closed shell 3 is, for example, a cylindrical closed container having a closed upper end portion and a closed lower end portion. A lubricating oil storage portion 3a for storing lubricating oil for lubricating the compression mechanism 99 is formed in a bottom portion of the closed shell 3. Further, a compressor discharge pipe 2 is arranged in an upper portion of the closed shell 3 so as to be communicated to the internal space 7 of the closed shell 3.

The electric motor 8 is variable in, for example, operating frequency (or rotating frequency) through inverter control or other control, and includes a stator 8b and a rotor 8a. The stator 8b is formed into a substantially cylindrical shape, and an outer peripheral portion of the stator 8b is fixed to the closed shell 3 by, for example, shrinkage fitting. A coil is wound around the stator 8b. Electric power is supplied to the coil from an external power source. The rotor 8a is formed into a substantially cylindrical shape, and is arranged in an inner peripheral portion of the stator 8b with a predetermined gap formed between an inner peripheral surface of the stator 8b and the rotor 8a. The drive shaft 5 is fixed to the rotor 8a, and the electric motor 8 and the compression mechanism 99 are connected to each other through intermediation of the drive shaft 5. That is, the electric motor 8 is rotated to transmit rotational power to the compression mechanism 99 through the drive shaft 5.

The drive shaft 5 includes a long shaft portion 5a forming an upper portion of the drive shaft 5, a short shaft portion 5b forming a lower portion of the drive shaft, eccentric pin shaft portions 5c and 5d formed between the long shaft portion 5a and the short shaft portion 5b, and an intermediate shaft portion 5e. In this case, a center axis of the eccentric pin shaft portion 5c is eccentric to center axes of the long shaft portion 5a and the short shaft portion 5b by a predetermined distance, and the eccentric pin shaft portion 5c is arranged in a first cylinder chamber 12 of the first compression unit 10 described later. Further, a center axis of the eccentric pin shaft portion 5d is eccentric to the center axes of the long shaft portion 5a and the short shaft portion 5b by a predetermined distance, and the eccentric pin shaft portion 5d is arranged in a second cylinder chamber 22 of the second compression unit 20 described later.

Further, the eccentric pin shaft portion 5c and the eccentric pin shaft portion 5d are arranged to be 180 degrees out of phase with each other. The eccentric pin shaft portion 5c and the eccentric pin shaft portion 5d are connected to each other by the intermediate shaft portion 5e. Note that, the intermediate shaft portion 5e is arranged in a through hole of an intermediate partition plate 4 described later. In the drive shaft 5 constructed as described above, the long shaft portion 5a is rotatably supported by a bearing portion 60a of a first support member 60, and the short shaft portion 5b is rotatably supported by a bearing portion 70a of a second support member 70.

That is, the eccentric pin shaft portions 5c and 5d of the drive shaft 5 are configured to perform eccentric rotary motion in the first cylinder chamber 12 and the second cylinder chamber 22, respectively.

The compression mechanism 99 includes the rotary-type first compression unit 10 arranged in an upper portion of the compression mechanism 99, and the rotary-type second compression unit 20 arranged in a lower portion thereof. The first compression unit 10 and the second compression unit 20 are arranged below the electric motor 8. In the compression mechanism 99, the first support member 60, a first cylinder 11 forming the first compression unit 10, the intermediate partition plate 4, a second cylinder 21 forming the second compression unit 20, and the second support member 70 are sequentially stacked from an upper side to a lower side of the compression mechanism 99.

The first compression unit 10 includes the first cylinder 11, a first piston 13, and a first vane 14. The first cylinder 11 is a flat plate member having a substantially cylindrical through hole formed therethrough in an up-and-down direction to be substantially concentric with the drive shaft 5 (more specifically, the long shaft portion 5a and the short shaft portion 5b). One end portion (upper end portion in FIG. 1) of the through hole is closed by a flange portion 60b of the first support member 60, and the other end portion (lower end portion in FIG. 1) of the through hole is closed by the intermediate partition plate 4. Thus, the first cylinder chamber 12 is defined.

The first piston 13 is arranged in the first cylinder chamber 12 of the first cylinder 11. The first piston 13 is formed into a ring shape, and is slidably arranged on the eccentric pin shaft portion 5c of the drive shaft 5. Further, a vane groove 19 is formed in the first cylinder 11. The vane groove 19 is communicated to the first cylinder chamber 12, and extends in a radial direction of the first cylinder chamber 12. The first vane 14 is slidably arranged in the vane groove 19. A distal end portion 14a of the first vane 14 abuts on an outer peripheral portion of the first piston 13, thereby partitioning the first cylinder chamber 12 into a suction chamber 12a and a compression chamber 12b.

Further, in the first cylinder 11, a vane back chamber 15 is formed behind the vane groove 19, that is, behind the first vane 14. The vane back chamber 15 is formed so as to pass through the first cylinder 11 in the up-and-down direction. Further, an upper opening portion of the vane back chamber 15 is partially open toward the internal space 7 of the closed shell 3, thereby enabling the lubricating oil stored in the lubricating oil storage portion 3a to flow into the vane back chamber 15. The lubricating oil flowing into the vane back chamber 15 flows into a space between the vane groove 19 and the first vane 14, thereby reducing slide resistance therebetween. As described later, the two-cylinder rotary compressor 100 according to Embodiment 1 is configured to discharge the refrigerant, which is compressed by the compression mechanism 99, into the internal space 7 of the closed shell 3. Accordingly, the vane back chamber 15 has the same high-pressure atmosphere as that of the internal space 7 of the closed shell 3.

The second compression unit 20 includes the second cylinder 21, a second piston 23, and the second vane 24. The second cylinder 21 is a flat plate member having a substantially cylindrical through hole formed therethrough in the up-and-down direction to be substantially concentric with the drive shaft 5 (more specifically, the long shaft portion 5a and the short shaft portion 5b). One end portion (upper end portion in FIG. 1) of the through hole is closed by the intermediate partition plate 4, and the other end portion (lower end portion in FIG. 1) of the through hole is closed by a flange portion 70b of the second support member 70. Thus, the second cylinder chamber 22 is defined.

The second piston 23 is arranged in the second cylinder chamber 22 of the second cylinder 21. The second piston 23 is formed into a ring shape, and is slidably arranged on the eccentric pin shaft portion 5d of the drive shaft 5. Further, a vane groove 29 is formed in the second cylinder 21. The vane groove 29 is communicated to the second cylinder chamber 22, and extends in a radial direction of the second cylinder chamber 22. The second vane 24 is slidably arranged in the vane groove 29. A distal end portion 24a of the second vane 24 abuts on an outer peripheral portion of the second piston 23, thereby partitioning the second cylinder chamber 22 into a suction chamber and a compression chamber similarly to the first cylinder chamber 12.

Further, in the second cylinder 21, a vane back chamber 25 is formed behind the vane groove 29, that is, behind the second vane 24. The vane back chamber 25 is formed so as to pass through the second cylinder 21 in the up-and-down direction. Further, upper and lower opening portions of the vane back chamber 25 are closed by the intermediate partition plate 4 and the flange portion 70b of the second support member 70, respectively. The vane back chamber 25 and the internal space 7 of the closed shell 3 are communicated to each other by a passage 30 communicated from an outer peripheral surface of the second cylinder 21 to the vane back chamber 25. That is, the lubricating oil stored in the lubricating oil storage portion 3a can flow into the vane back chamber 25 through the passage 30. Accordingly, the vane back chamber 25 has the same high-pressure atmosphere as that of the internal space 7 of the closed shell 3. Further, the lubricating oil flowing into the vane back chamber 25 flows into a space between the vane groove 29 and the second vane 24, thereby reducing slide resistance therebetween.

Note that, at least one of the opening portions of the vane back chamber 25 may be open toward the internal space 7 of the closed shell 3, thereby enabling the lubricating oil stored in the lubricating oil storage portion 3a to flow into the vane back chamber 25 also through the opening portion.

A suction muffler 6 for causing gaseous refrigerant to flow into the first cylinder chamber 12 and the second cylinder chamber 22 is connected to each of the first cylinder 11 and the second cylinder 21. Specifically, the suction muffler 6 includes a container 6b, an inflow pipe 6a, an outflow pipe 6c, and an outflow pipe 6d. Low-pressure refrigerant that flows out of an evaporator constructing the refrigeration cycle is stored in the container 6b. The inflow pipe 6a guides the low-pressure refrigerant from the evaporator into the container 6b. The outflow pipe 6c guides, into the first cylinder chamber 12 of the first cylinder 11, the gaseous refrigerant of the refrigerant stored in the container 6b. The outflow pipe 6d guides, into the second cylinder chamber 22 of the second cylinder 21, the gaseous refrigerant of the refrigerant stored in the container 6b. The outflow pipe 6c of the suction muffler 6 is connected to the cylinder suction passage 17 (passage communicated to the first cylinder chamber 12) of the first cylinder 11, and the outflow pipe 6d of the suction muffler 6 is connected to the cylinder suction passage 27 (passage communicated to the second cylinder chamber 22) of the second cylinder 21.

Further, the discharge port 18 is formed in the first cylinder 11, and the gaseous refrigerant compressed in the first cylinder chamber 12 is discharged through the discharge port 18. The discharge port 18 is communicated to the through hole formed in the flange portion 60b of the first support member 60, and an on-off valve 18a is arranged over the through hole. The on-off valve 18a is open when a pressure in the first cylinder chamber 12 is equal to or higher than a predetermined pressure. Further, a discharge muffler 63 is mounted onto the first support member 60 so as to cover the on-off valve 18a (that is, the through hole).

Similarly, the discharge port 28 is formed in the second cylinder 21, and the gaseous refrigerant compressed in the second cylinder chamber 22 is discharged through the discharge port 28. The discharge port 28 is communicated to the through hole formed in the flange portion 70b of the second support member 70, and an on-off valve 28a is arranged over the through hole. The on-off valve 28a is open when a pressure in the second cylinder chamber 22 is equal to or higher than a predetermined pressure. Further, a discharge muffler 73 is mounted onto the second support member 70 so as to cover the on-off valve 28a (that is, the through hole).

[Characteristic Configuration of Compression Mechanism 99]

As described above, the first compression unit 10 and the second compression unit 20 basically have the same configurations, but detailed configurations of the first compression unit 10 and the second compression unit 20 are different in the following points.

(1) Pressing Force Applied to First Vane 14 and Second Vane 24

A suction pressure (pressure of the low-pressure refrigerant sucked into the first cylinder chamber 12 and the second cylinder chamber 22) is applied to both of the distal end portion 14a side of the first vane 14 and the distal end portion 24a side of the second vane 24, and a discharge pressure (pressure in the internal space 7 of the closed shell 3, that is, pressure of high-pressure refrigerant compressed by the compression mechanism 99) is applied to a rear end portion 14b side of the first vane 14 and a rear end portion 24b side of the second vane 24. Accordingly, a pressing force is applied to the first vane 14 in a direction of pressing the first vane 14 toward the first piston 13 side in accordance with a difference between the pressures applied to the distal end portion 14a and the rear end portion 14b, and a pressing force is applied to the second vane 24 in a direction of pressing the second vane 24 toward the second piston 23 side in accordance with a difference between the pressures applied to the distal end portion 24a and the rear end portion 24b.

In addition to the above-mentioned pressing force, a pressing force for pressing the first vane 14 toward the first piston 13 side is applied to the first vane 14 by a compression spring 40. Accordingly, the first vane 14 is always pressed against the first piston 13, thereby partitioning the first cylinder chamber 12 into the suction chamber 12a and the compression chamber 12b. That is, the first compression unit 10 including the first vane 14 always compresses the refrigerant flowing into the first cylinder chamber 12.

On the other hand, the rear end portion 24b of the second vane 24 is pulled by a tension spring 50 fixed to the closed shell 3 at a spring fixing portion 42. That is, due to a reaction force (elastic force) of the tension spring 50, a pulling force is applied to the second vane 24 in a direction of separating the second vane 24 away from an outer peripheral wall of the second piston 23 (direction of moving the second vane 24 to the rear end portion 24b side). Accordingly, a smaller pressing force for pressing the vane toward the second piston 23 side is applied to the second vane 24 of the second compression unit 20 as compared to the first vane 14 of the first compression unit 10. In other words, a larger pulling force is applied to the second vane 24 of the second compression unit 20 in the direction of separating the second vane 24 away from the outer peripheral wall of the second piston 23 (direction of moving the second vane 24 to the rear end portion 24b side) as compared to the first vane 14 of the first compression unit 10.

Accordingly, when the difference between the pressures applied to the distal end portion 24a and the rear end portion 24b of the second vane 24 is equal to or larger than a predetermined value, that is, when the pressing force applied to the second vane 24 due to the pressure difference (force for moving the second vane 24 to the second piston 23 side) is larger than the pulling force exerted by the tension spring 50, similarly to the first compression unit 10, the second cylinder chamber 22 is partitioned into the compression chamber and the suction chamber, and the second compression unit 20 compresses the refrigerant flowing into the second cylinder chamber 22. However, when the difference between the pressures applied to the distal end portion 24a and the rear end portion 24b of the second vane 24 is smaller than the predetermined value, that is, when the pulling force exerted by the tension spring 50 exceeds the pressing force applied to the second vane 24 due to the pressure difference (force for moving the second vane 24 to the second piston 23 side), the distal end portion 24a of the second vane 24 is separated away from the second piston 23, and the second compression unit 20 is brought into the rest state of not compressing the refrigerant in the second cylinder chamber 22.

(1) Retaining Mechanism for Second Vane 24

In addition, the second compression unit 20 including the tension spring 50 includes a retaining mechanism for retaining the second vane 24 when the second vane 24 is separated away from the outer peripheral wall of the second piston 23. The retaining mechanism according to Embodiment 1 includes a contact component 52 arranged on a back surface side of the second vane 24 with respect to the rear end portion 24*b*, a communication hole 51*a* formed in the second vane 24, and a communication hole 51*b* formed in the second cylinder 21.

The contact component 52 is arranged so as to partition the passage 30 and the vane back chamber 25 from each other. The contact component 52 has formed therein a communication hole 53 communicating the passage 30 and the vane back chamber 25. That is, the communication hole 53 communicates the internal space 7 of the closed shell 3 and a space formed on the rear end portion 24*b* side of the second vane 24. Note that, the second vane 24 side of the contact component 52 is formed of a flat surface portion, and the contact component 52 is arranged so as to keep a predetermined degree of parallelism between the flat surface portion 52*a* and the rear end portion 24*b* of the second vane 24.

One opening portion of the communication hole 51*a* formed in the second vane 24 is open toward the rear end portion 24*b* (more specifically, toward a position opposed to a part of the contact component 52 excluding the communication hole 53). Further, the other opening portion of the communication hole 51*a* is open toward a side surface portion of the second vane 24.

One opening portion of the communication hole 51*b* formed in the second cylinder 21 is open toward the vane groove 29. More specifically, the opening portion is open toward a position communicated to the communication hole 51*a* (position at which the opening portion of the communication hole 51*a* and the opening portion of the communication hole 51*b* are opposed to each other) under a state in which the second vane 24 is away from the outer peripheral wall of the second piston 23 and the rear end portion 24*b* is held in contact with the flat surface portion 52*a* of the contact component 52. Further, the other opening portion of the communication hole 51*b* is open toward the cylinder suction passage 27.

Note that, the communication holes 51*a* and 51*b* are not limited to the above-mentioned configurations as long as the communication holes 51*a* and 51*b* communicate the rear end portion 24*b* side of the second vane 24 and the cylinder suction passage 27. For example, the other opening portion (opening portion that is open toward the side surface portion of the second vane 24 in FIG. 2) of the communication hole 51*a* may be open toward an upper surface portion of the second vane 24. In this case, the communication hole 51*b* communicating the opening portion and the cylinder suction passage 27 includes a passage formed in the intermediate partition plate 4 to be communicated to the opening portion, and another passage formed in the second cylinder 21 to communicate the passage and the cylinder suction passage 27.

Further, for example, the other opening portion (opening portion that is open toward the side surface portion of the second vane 24 in FIG. 2) of the communication hole 51*a* may be open toward a bottom surface portion of the second vane 24. In this case, the communication hole 51*b* communicating the opening portion and the cylinder suction passage 27 includes a passage formed in the flange portion 70*b* of the second support member 70 to be communicated to the opening portion, and another passage formed in the second cylinder 21 to communicate the passage and the cylinder suction passage 27.

[Description of Action of Two-cylinder Rotary Compressor 100]

Next, description is made of action during operation of the two-cylinder rotary compressor 100 constructed as described above.

[Action when First Compression Unit 10 and Second Compression Unit 20 Compress Refrigerant]

First, description is made of action when both the first compression unit 10 and the second compression unit 20 compress the refrigerant. This action is similar to action of a general two-cylinder rotary compressor in which a compression unit is not brought into a rest state. Details of the action are as follows.

When power is supplied to the electric motor 8, the drive shaft 5 is rotated by the electric motor 8 counterclockwise when viewed from directly above (rotated by a phase θ with reference to a position of the vane as illustrated in FIG. 2). Along with the rotation of the drive shaft 5, the eccentric pin shaft portion 5*c* performs the eccentric rotary motion in the first cylinder chamber 12, and the eccentric pin shaft portion 5*d* performs the eccentric rotary motion in the second cylinder chamber 22. Note that, the eccentric pin shaft portion 5*c* and the eccentric pin shaft portion 5*d* perform the eccentric rotary motion so as to be 180 degrees out of phase with each other.

Along with the eccentric rotary motion of the eccentric pin shaft portion 5*c*, the first piston 13 performs the eccentric rotary motion in the first cylinder chamber 12, thereby compressing the low-pressure gaseous refrigerant sucked into the first cylinder chamber 12 from the outflow pipe 6*c* of the suction muffler 6 through the cylinder suction passage 17. Similarly, along with the eccentric rotary motion of the eccentric pin shaft portion 5*d*, the second piston 23 performs the eccentric rotary motion in the second cylinder chamber 22, thereby compressing the low-pressure gaseous refrigerant sucked into the second cylinder chamber 22 from the outflow pipe 6*d* of the suction muffler 6 through the cylinder suction passage 27.

When compressed up to the predetermined pressure, the gaseous refrigerant compressed in the first cylinder chamber 12 is discharged into the discharge muffler 63 through the discharge port 18, and then discharged into the internal space 7 of the closed shell 3 through a discharge port of the discharge muffler 63. Further, when compressed up to the predetermined pressure, the gaseous refrigerant compressed in the second cylinder chamber 22 is discharged into the discharge muffler 73 through the discharge port 28, and then discharged into the internal space 7 of the closed shell 3 through a discharge port of the discharge muffler 73. Then, the high-pressure gaseous refrigerant discharged into the internal space 7 of the closed shell 3 is discharged out of the closed shell 3 through the compressor discharge pipe 2.

When the first compression unit 10 and the second compression unit 20 compress the refrigerant, the first compression unit 10 and the second compression unit 20 repeat the refrigerant sucking action and the compressing action.

[Action when Second Compression Unit 20 is Brought into Rest State]

Now, with reference to FIG. 1 to FIG. 4, description is made of action when the second compression unit 20 is brought into the rest state. Note that, also during this action, the first vane 14 pressed by the compression spring 40 is always held in contact with the first piston 13, and the first compression unit 10 performs the above-mentioned same refrigerant compressing action. Accordingly, in the following, description is made of action of the second compression unit 20 when the second compression unit 20 is brought into the rest state.

Under the above-mentioned state in which the second compression unit 20 compresses the refrigerant, the discharge pressure is applied to the entire rear end portion 24b of the second vane 24 through the lubricating oil. Accordingly, the pressing force (force for moving the second vane 24 to the second piston 23 side) caused by the difference between the pressures applied to the distal end portion 24a and the rear end portion 24b of the second vane 24 exceeds the pulling force (force for moving the second vane 24 away from the second piston 23) exerted by the tension spring 50. Thus, the distal end portion 24a of the second vane 24 is pressed against the outer peripheral wall of the second piston 23. Therefore, along with the rotation of the drive shaft 5, the second compression unit 20 compresses the refrigerant.

In this state, as illustrated in FIG. 3, a position of the communication hole 51a formed in the second vane 24 and a position of the communication hole 51b formed in the second cylinder 21 do not align with each other. Accordingly, the communication hole 51a formed in the second vane 24 is closed by a side wall of the vane groove 29, and the communication hole 51b formed in the second cylinder 21 is closed by the side surface portion of the second vane 24. Therefore, an interior of the communication hole 51a formed in the second vane 24 is maintained at the discharge pressure.

On the other hand, immediately after start of operation of the two-cylinder rotary compressor 100, and under a state in which the two-cylinder rotary compressor 100 is subjected to a low load, the pressure in the internal space 7 of the closed shell 3 is low. Accordingly, the pulling force exerted by the tension spring 50 exceeds the pressing force caused by the difference between the pressures applied to the distal end portion 24a and the rear end portion 24b of the second vane 24. Thus, under a state in which the discharge pressure is applied to the entire rear end portion 24b of the second vane 24, and in which the suction pressure is applied to the entire distal end portion 24a of the second vane 24, the second vane 24 is away from the outer peripheral wall of the second piston 23 so that the second compression unit 20 is brought into the rest state (non-compression state).

When the second vane 24 is further moved in a direction away from the outer peripheral wall of the second piston 23, as illustrated in FIG. 4, the opening portion of the communication hole 51a formed in the second vane 24 and the opening portion of the communication hole 51b formed in the second cylinder 21 start to overlap each other. That is, the communication hole 51a formed in the second vane 24 is communicated through the communication hole 51b to the cylinder suction passage 27 maintained at the suction pressure. Accordingly, through the communication hole 51a and the communication hole 51b, the lubricating oil in the vicinity of the opening portion of the communication hole 51a on the rear end portion 24b side flows into the cylinder suction passage 27, with the result that the pressing force applied to the rear end portion 24b of the second vane 24 is reduced. In this manner, the second vane 24 is further moved in the direction away from the outer peripheral wall of the second piston 23, and the rear end portion 24b of the second vane 24 is brought into contact with the flat surface portion 52a of the contact component 52.

Under a state in which the rear end portion 24b of the second vane 24 is held in contact with the contact component 52, the discharge pressure is applied to the rear end portion 24b of the second vane 24 only in a range where the second vane 24 is opposed to the communication hole 53 of the contact component 52. Accordingly, the pressing force applied to the second vane 24 is further reduced so that a significant difference is exhibited between the pulling force and the pressing force. As a result, the second vane 24 is stably retained in a state of being away from the outer peripheral wall of the second piston 23.

[Action of Canceling Rest State of Second Compression Unit 20 (Retention of Second Vane 24)]

Next, description is made of action of canceling the rest state of the second compression unit 20 (retention of the second vane 24). When the pressure in the internal space 7 of the closed shell 3 (that is, the discharge pressure) is increased under a state in which the second vane 24 is stably retained, the pressing force caused by the pressure difference between the "suction pressure applied to the entire distal end portion 24a of the second vane 24" and the "discharge pressure applied in the range of the rear end portion 24b of the second vane 24 opposed to the communication hole 53 of the contact component 52" exceeds the pulling force exerted by the tension spring 50. In this state, the second vane 24 is moved away from the contact component 52, thereby canceling the retention of the second vane 24.

Once the second vane 24 is separated from the contact component 52, the position of the communication hole 51a formed in the second vane 24 and the position of the communication hole 51b formed in the second cylinder 21 do not align with each other, and thus the suction pressure is not led to the communication hole 51b. Further, the lubricating oil is supplied to the entire rear end portion 24b of the second vane 24, and the discharge pressure is applied to the entire rear end portion 24b of the second vane 24, with the result that the pressing force applied to the second vane 24 is increased. In this manner, the significant difference is exhibited between the pressing force and the pulling force applied to the second vane 24. Thus, the second vane 24 is further moved to the second piston 23 side, and the distal end portion 24a of the second vane 24 is pressed against the outer peripheral wall of the second piston 23. Accordingly, the second compression unit 20 starts action of compressing the refrigerant.

Note that, under a state in which the second vane 24 is stably retained on the contact component 52 side, the pressure applied in the range of the rear end portion 24b of the second vane 24 opposed to the communication hole 53 of the contact component 52 is kept below a predetermined pressure value, that is, the pressure difference between the "suction pressure applied to the entire distal end portion 24a of the second vane 24" and the "discharge pressure applied in the range of the rear end portion 24b of the second vane 24 opposed to the communication hole 53 of the contact component 52" is suppressed at the predetermined value or less. In this manner, the second compression unit 20 can maintain the rest state. Further, under a state in which the distal end portion 24a of the second vane 24 is pressed against the outer peripheral wall of the second piston 23, the pressure difference between the "suction pressure applied to the entire distal end portion 24a of the second vane 24" and the "discharge pressure applied to the entire rear end portion 24b of the second vane 24" is kept at the predetermined value or more. In this manner, the second compression unit 20 can maintain the refrigerant compression state.

[Relationship Between Pressures Applied to Second Vane 24 and Action of Second Vane 24]

Figure 5:
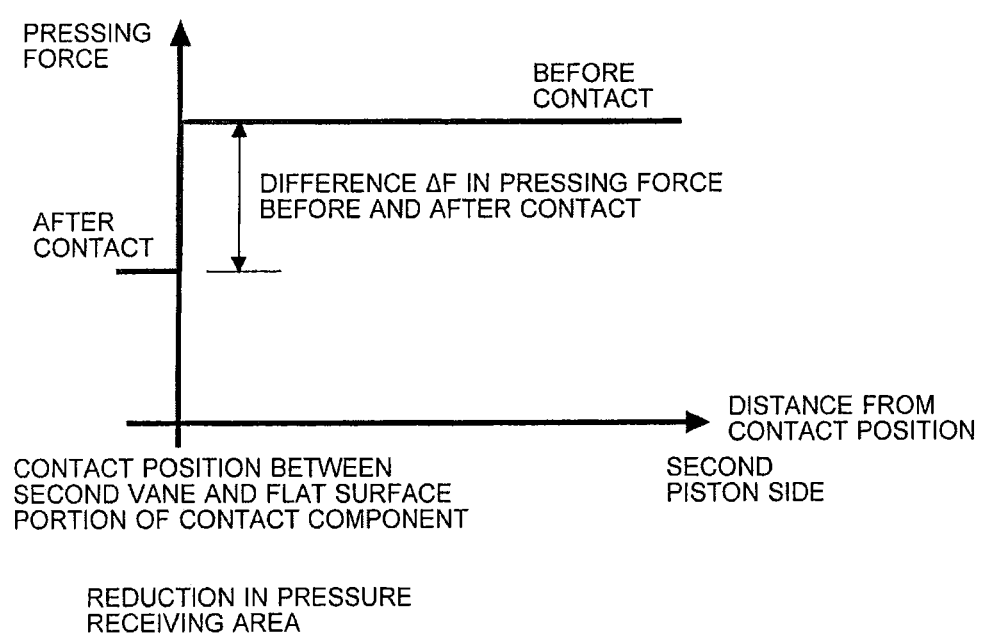
FIG. 5 is a graph showing a relationship between a position of the second vane 24 in the two-cylinder rotary compressor 100 of FIG. 1 and a pressing force caused by a pressure applied to the second vane 24.
Figure 6:
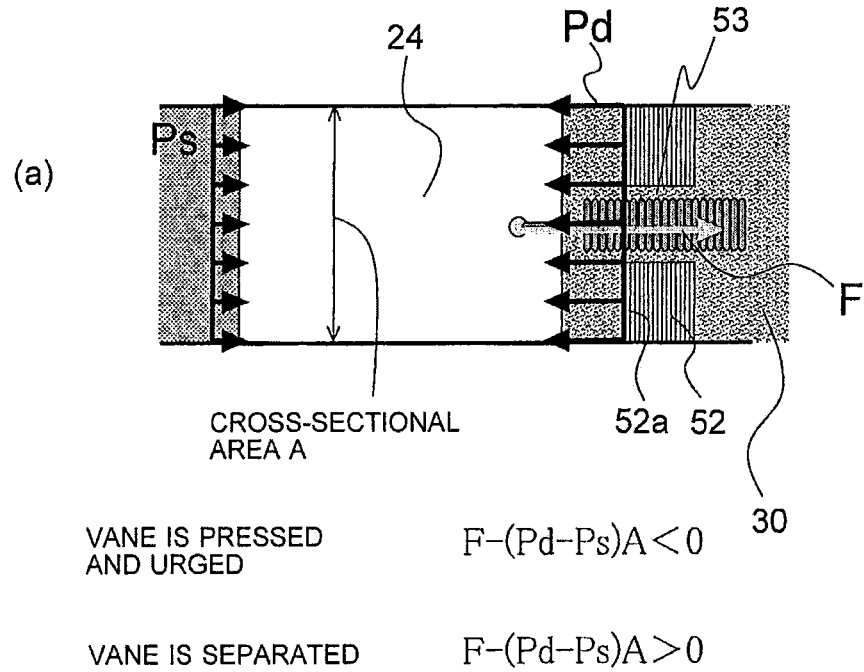
FIG. 6 are explanatory views illustrating a relationship between the pressing force and a pulling force applied to the second vane 24 of the two-cylinder rotary compressor 100 of FIG. 1.
Figure 6:
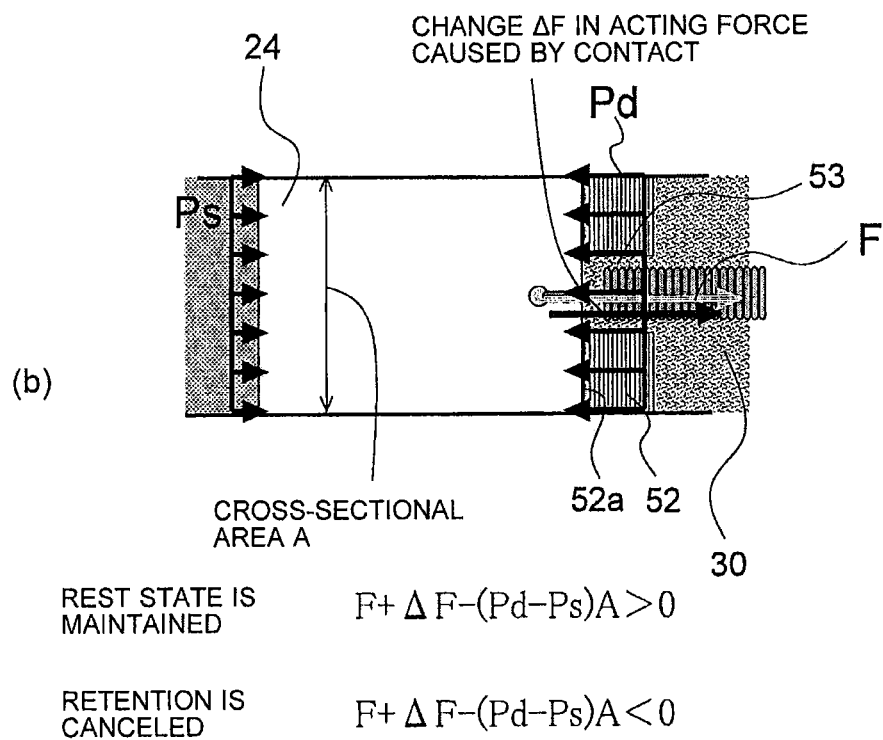

FIG. 5 is a graph showing a relationship between a position of the second vane 24 in the two-cylinder rotary compressor 100 of FIG. 1 and the pressing force caused by the pressures applied to the second vane 24. Further, FIG. 6 are explanatory views illustrating a relationship between the pressing force and the pulling force applied to the second vane 24 of the two-cylinder rotary compressor 100 of FIG. 1. Note that, FIG. 6(a) is a side view illustrating a state in which the second vane 24 and the flat surface portion 52a of the contact component 52 are not held in contact with each other, and FIG. 6(b) is a side view illustrating a state in which the second vane 24 and the flat surface portion 52a of the contact component 52 are held in contact with each other.

A suction pressure Ps is applied to the distal end portion 24a of the second vane 24, and a discharge pressure Pd is applied to the rear end portion 24b thereof. Further, a pulling force F exerted by the tension spring 50 is also applied to the second vane 24. Based on a relationship among the pressure Ps, the pressure Pd, and the force F applied to the second vane 24, a state of the second vane 24 is determined.

First, description is made of the state in which the second vane 24 and the flat surface portion 52a of the contact component 52 are not held in contact with each other.

When the area of a cross-section of the second vane 24 taken along a direction perpendicular to a moving direction of the second vane 24 (which is approximate to the surface area of the distal end portion 24a and the surface area of the rear end portion 24b) is represented by A, under the state in which the second vane 24 and the flat surface portion 52a of the contact component 52 are not held in contact with each other, the pressing force applied to the second vane 24 due to the suction pressure Ps and the discharge pressure Pd is represented by (Pd−Ps)A. Accordingly, under the refrigerant compression state in which the second vane 24 is pressed against the second piston 23, a relationship of F−(Pd−Ps)A<0 is satisfied. Further, under the non-compression state in which the second vane 24 is away from the second piston 23, a relationship of F−(Pd−Ps)A>0 is satisfied.

Next, description is made of the state in which the second vane 24 and the flat surface portion 52a of the contact component 52 are held in contact with each other.

When the second vane 24 is brought into contact with the flat surface portion 52a of the contact component 52, the area of the second vane 24 subjected to the discharge pressure Pd (pressure receiving area) is reduced to a cross-sectional area B of the communication hole 53 formed in the contact component 52. A change ΔF of the pressing force due to the reduction in the pressure receiving area is represented by ΔF=(Pd−Ps)(A−B), and it can be considered that the pulling force is added by an amount corresponding to this change (which can be treated similarly to a magnetic force or another force applied in another embodiment described later). That is, the change ΔF can be referred to as a difference between the "difference between the pulling force and the pressing force under the state in which the second vane 24 is held in contact with the flat surface portion 52a of the contact component 52 (state in which the retaining mechanism retains the second vane 24)" and the "difference between the pulling force and the pressing force under a state in which the second vane 24 is away from the second piston 23 and the second vane 24 is not held in contact with the flat surface portion 52a of the contact component 52 (state in which the retaining mechanism does not retain the second vane 24). Therefore, based on the relationship among the pressure Ps, the pressure Pd, and the force F applied to the second vane 24 under the state in which the second vane 24 and the flat surface portion 52a of the contact component 52 are held in contact with each other, the second vane 24 acts as follows. That is, under the state in which the second vane 24 is stably retained, a relationship of F+ΔF−(Pd−Ps)A>0 is satisfied. Further, under a state in which the retention of the second vane 24 is canceled, a relationship of F+ΔF−(Pd−Ps)A<0 is satisfied.

In the two-cylinder rotary compressor 100 constructed as described above, as compared to the first compression unit 10, the second compression unit 20 is subjected to a smaller pressing force for pressing the second vane 24 toward the second piston 23 side. In other words, as compared to the first compression unit 10, the second compression unit 20 is subjected to a larger pulling force applied to the second vane 24 to separate the second vane 24 in the direction away from the second piston 23.

Accordingly, when the pressure applied to the rear end portion 24b of the second vane 24 is smaller than the predetermined value, the second vane 24 of the second compression unit 20 is separated away from the second piston 23, and the second compression unit 20 is brought into the rest state. Therefore, the two-cylinder rotary compressor 100 can reduce a compressor loss in a low-load condition, and can achieve enhancement of efficiency of the compressor and increase of a capacity range, thereby being capable of enhancing energy-saving performance in actual load operation. At this time, the two-cylinder rotary compressor 100 according to Embodiment 1 does not require a mechanical volume control unit including an on-off valve, a switching valve, and a pipe, which are required in the two-cylinder rotary compressor disclosed in Patent Literature 1. Thus, it is possible to prevent increase in size and cost of the two-cylinder rotary compressor 100.

Further, the two-cylinder rotary compressor 100 includes the retaining mechanism arranged in the second compression unit 20, for retaining the second vane 24 in contact with the second vane 24 when the second vane 24 is moved away from the second piston 23. Accordingly, the two-cylinder rotary compressor 100 according to Embodiment 1 can stably maintain the position of the second vane 24 when the second vane 24 is separated away from the outer peripheral wall of the second piston 23.

Note that, the example in which the second compression unit 20 to be brought into the rest state is arranged below the first compression unit 10 is described above. However, as a matter of course, the second compression unit 20 to be brought into the rest state may be arranged above the first compression unit 10.

Further, the two-cylinder rotary compressor 100 of a high-pressure closed shell type is described above, but the above-mentioned second compression unit 20 may be employed in a two-cylinder rotary compressor of another shell type. In this case, the same effect as the above-mentioned effect can be attained. For example, even when the second compression unit 20 described in Embodiment 1 is employed in a two-cylinder rotary compressor of a semi-closed type and a two-cylinder rotary compressor of a medium-pressure shell type, the same effect as the above-mentioned effect can be attained.

The configuration and the action of the two-cylinder rotary compressor 100 are clarified in the above description. Now, a characteristic configuration of Embodiment 1 is described. Embodiment 1 has a feature of being capable of determining whether an operation mode is single operation or parallel operation. Now, description is made of a heat pump apparatus 200 capable of determining whether the operation mode is the single operation or the parallel operation.

<Basic Configuration of Heat Pump Apparatus 200>

Figure 7:
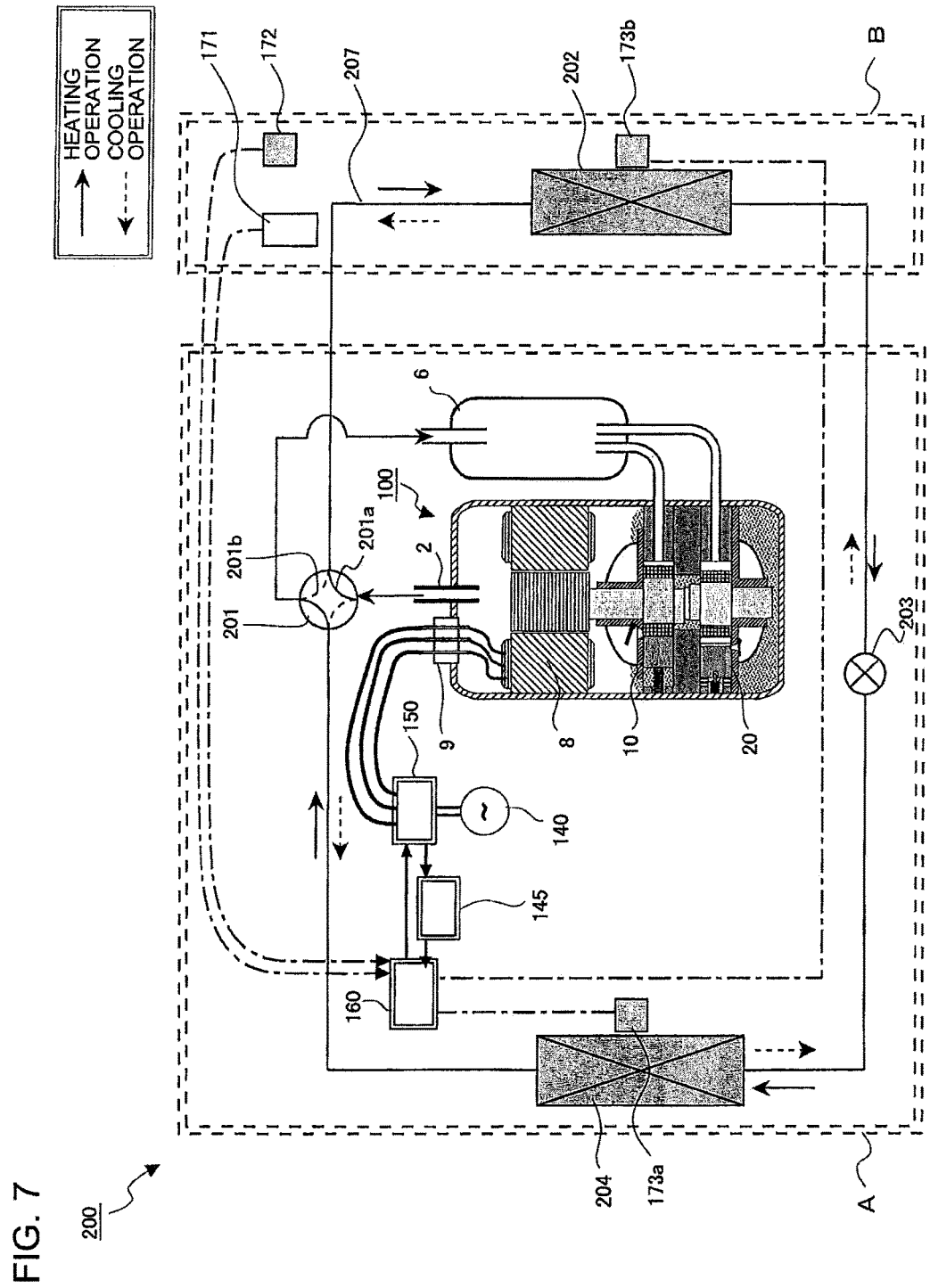
FIG. 7 is a view illustrating a basic configuration of a heat pump apparatus 200 according to Embodiment 1 of the present invention.

FIG. 7 is a view illustrating a basic configuration of the heat pump apparatus 200 according to Embodiment 1 of the present invention.

The heat pump apparatus 200 includes the same two-cylinder rotary compressor 100 as illustrated in FIG. 1, a four-way valve 201, an indoor-side heat exchanger 202, a pressure reducing mechanism 203, and an outdoor-side heat exchanger 204. Those components are connected by a refrigerant circuit pipe 207 to form a vapor-compression refrigeration cycle. Now, a heat pump apparatus for air-conditioning is described as an example of the heat pump apparatus 200.

The heat pump apparatus 200 can be switched by the four-way valve 201 between heating operation and cooling operation. In a case of the heating operation, the four-way valve 201 is connected to a side of a heating-operation channel 201a indicated by the solid line of FIG. 7. In this manner, refrigerant gas compressed into a high-temperature and high-pressure state by the two-cylinder rotary compressor 100 flows into the indoor-side heat exchanger 202, and the indoor-side heat exchanger 202 acts as a heat-rejecting-side heat exchanger (condenser). In a case of the cooling operation, the four-way valve 201 is connected to a side of a cooling-operation channel 201b indicated by the dotted line of FIG. 7. In this manner, a suction side of the two-cylinder rotary compressor 100 is connected to the indoor-side heat exchanger 202, and the indoor-side heat exchanger 202 acts as a heat-removing-side heat exchanger (evaporator).

As described above, the two-cylinder rotary compressor 100 includes the electric motor 8 and the two compression units 10 and 20, and has such structure that the single operation in which one of the compression units is brought into the non-compression state, and the normal parallel operation in which both the compression units are brought into the compression state are switched passively depending on operation conditions. Specifically, as described above, immediately after start of operation of the two-cylinder rotary compressor 100, and under the state in which the two-cylinder rotary compressor 100 is subjected to the low load, the single operation is performed. When the pressure in the internal space 7 of the closed shell 3 is increased, the parallel operation is performed.

The indoor-side heat exchanger 202 is arranged in an indoor space B, and the two-cylinder rotary compressor 100, the four-way valve 201, the pressure reducing mechanism 203, and the outdoor-side heat exchanger 204 are arranged in an outdoor space A.

<Sensors> S

Next, sensors arranged in the heat pump apparatus 200 are described.

A heat exchanger temperature sensor 173a for detecting an evaporating temperature or a condensing temperature of the outdoor-side heat exchanger 204 is provided in the outdoor space A.

An indoor temperature sensor 172 for detecting an indoor temperature, and a heat exchanger temperature sensor 173b for detecting an evaporating temperature or a condensing temperature of the indoor-side heat exchanger 202 are provided in the indoor space B.

Signals of detection of the heat exchanger temperature sensor 173a, the heat exchanger temperature sensor 173b, and the indoor temperature sensor 172 are input to a heat pump capacity control device 160 described later. Note that, the sensors used for control of the heat pump apparatus 200 are not limited to the sensors illustrated in FIG. 7. Temperature sensors arranged on a gas side and a liquid side of the indoor-side heat exchanger 202, a temperature sensor and a pressure sensor arranged on a suction side and a discharge side of the two-cylinder rotary compressor 100, and other sensors may be used appropriately as needed.

<Control Circuit>

Next, a control circuit arranged in the heat pump apparatus 200 is described.

Figure 8:
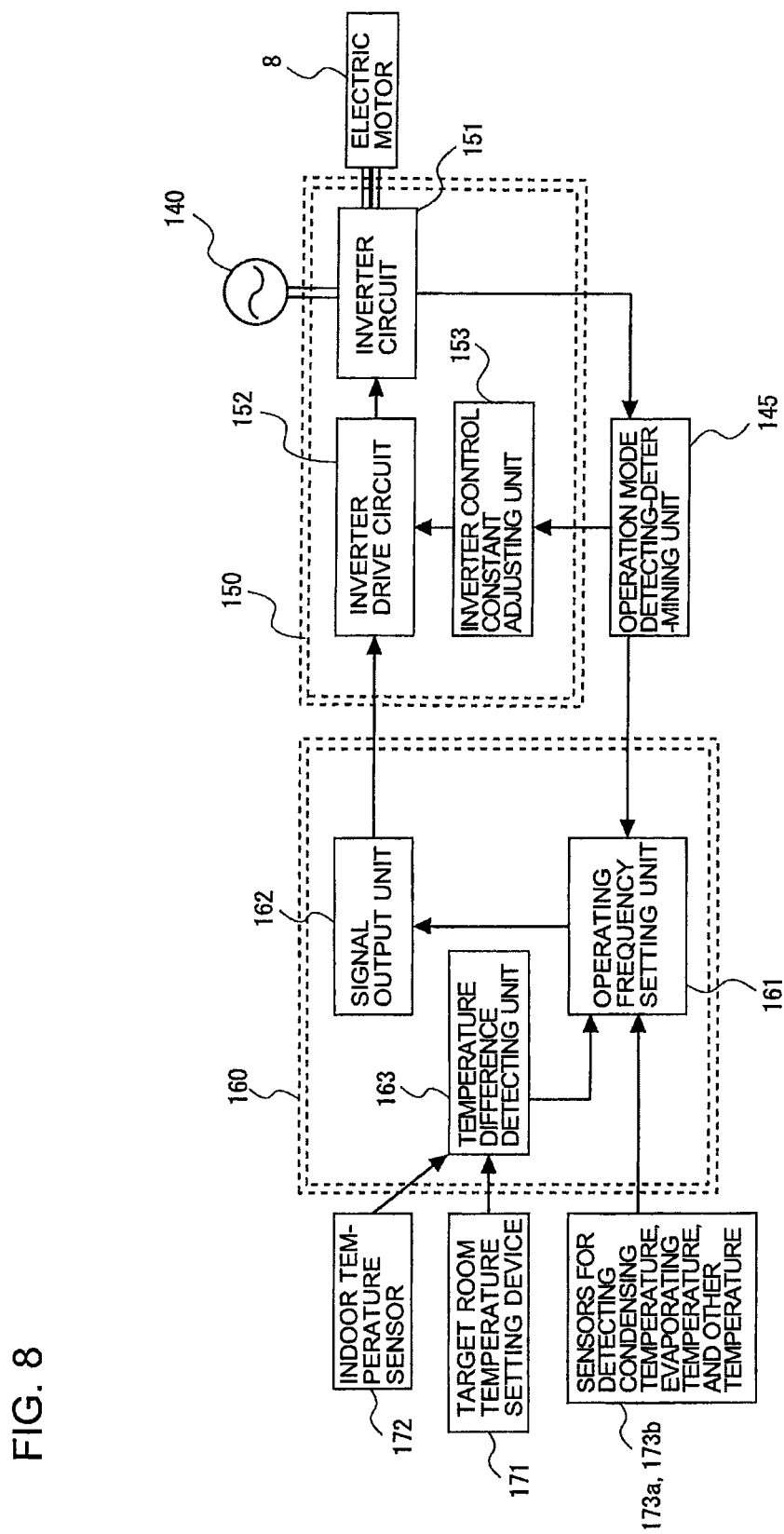
FIG. 8 is a schematic view illustrating a control circuit of the heat pump apparatus 200 according to Embodiment 1 of the present invention.

FIG. 8 is a schematic view illustrating the control circuit of the heat pump apparatus 200 according to Embodiment 1 of the present invention.

An inverter drive control device 150 for driving the two-cylinder rotary compressor 100 by a power source supplied from an AC power source 140, and the heat pump capacity control device 160 are provided in the outdoor space A. An operation mode detecting-determining unit 145 is further provided in Embodiment 1 of the present invention, which is a feature of the present invention.

The heat pump capacity control device 160 is a device for determining the operating frequency of the electric motor 8 so as to bring a temperature detected by the indoor temperature sensor 172 close to a target room temperature set by a target room temperature setting device 171, to thereby control the inverter drive control device 150 so as to cause the electric motor 8 to act at the determined operating frequency. The heat pump capacity control device 160 includes a temperature difference detecting unit 163 for detecting a temperature difference between an actual value of the room temperature detected by the indoor temperature sensor 172 and the target value of the room temperature set by the target room temperature setting device 171, an operating frequency setting unit 161, and a signal output unit 162.

The operating frequency setting unit 161 determines the operating frequency suitable for achieving the target room temperature based on the operation conditions such as the operating frequency and a current operation mode (single operation or parallel operation) detected by the operation mode detecting-determining unit 145 described later, the temperature difference (operation load) detected by the temperature difference detecting unit 163, and the temperature conditions of the indoor-side heat exchanger 202 and the outdoor-side heat exchanger 204 acquired from the various sensors 173a to 173c. The signal output unit 162 transmits a command signal to an inverter drive circuit 152 of the inverter drive control device 150, which is described later, so as to cause the electric motor 8 to act at the operating frequency determined by the operating frequency setting unit 161.

The inverter drive control device 150 is connected to the electric motor 8 of the two-cylinder rotary compressor 100 through intermediation of a hermetic terminal (three-phase terminal) 9 of the closed shell 3. The inverter drive control device 150 is a device for converting electric power supplied from the AC power source 140 into a three-phase current suitable for driving the electric motor 8, and then supplying the three-phase current to the electric motor 8. In this case, the electric motor 8 is a brushless DC motor, and the inverter drive control device 150 vector-controls the brushless DC motor.

The inverter drive control device 150 includes an inverter circuit 151, the inverter drive circuit 152, and an inverter control constant adjusting unit 153. Based on the operating frequency output from the signal output unit 162 and a control constant output from the inverter control constant adjusting unit 153, the inverter drive circuit 152 adjusts a voltage waveform so as to maintain an optimum operation state, and then outputs the voltage waveform to the inverter circuit 151. Based on the voltage waveform output from the inverter drive circuit 152, the inverter circuit 151 converts electric power supplied from the AC power source 140 into the three-phase current suitable for driving the electric motor 8, and then supplies the three-phase current to the electric motor 8. That is, the inverter circuit 151 converts electric power supplied from the AC power source 140 into an alternating current having the operating frequency determined by the operating frequency setting unit 161, and then supplies the alternating current to the electric motor 8.

Based on an electric signal acquired from the inverter drive control device 150, the operation mode detecting-determining unit 145 determines whether the current operation mode is the single operation or the parallel operation. Specifically, the operation mode detecting-determining unit 145 determines whether the current operation mode is the single operation or the parallel operation by observing and analyzing a current waveform of the inverter circuit 151. The result of determination is output to the inverter control constant adjusting unit 153 and the operating frequency setting unit 161.

<Method of Determining Operation Mode>

Next, a principle of determining the operation mode by the operation mode detecting-determining unit 145 is described.

First, analyses were conducted on a torque fluctuation when the two-cylinder rotary compressor 100 performed the single operation at a displacement volume of 7 cc for one cylinder, a torque fluctuation when the two-cylinder rotary compressor 100 performed the parallel operation at a displacement volume of 14 cc for two cylinders, and a current waveform to be input to a six-pole brushless DC (direct current) motor. The operations were performed under a low-load heating condition assumed as follows: R410A was used as refrigerant; a suction pressure Ps was 1.1 [MPa]; a discharge pressure Pd was 1.6 [MPa]; and frequency was 10 [Hz].

Figure 9:
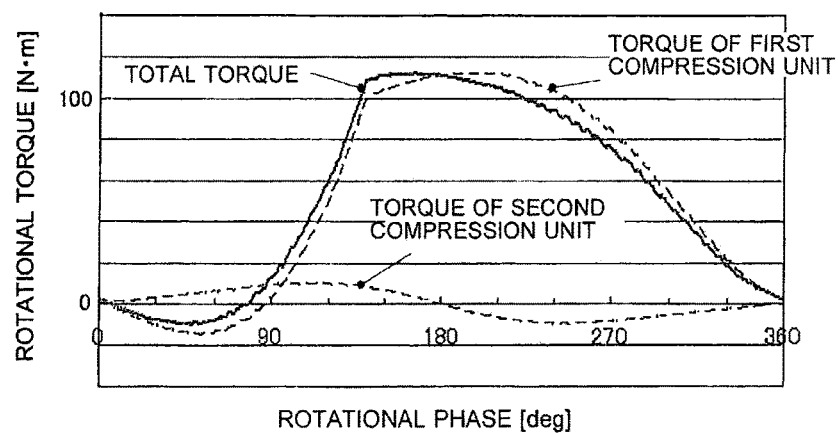
Figure 9:
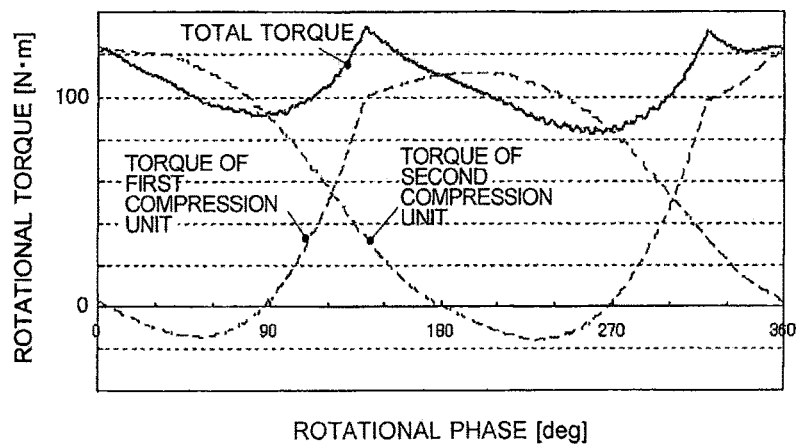

FIG. 9 are graphs showing the torque fluctuations in the two-cylinder rotary compressor 100 of FIG. 7. FIG. 9(*a*) is a graph showing the torque fluctuation during the single operation, and FIG. 9(*b*) is a graph showing the torque fluctuation during the parallel operation. FIG. 9 show the horizontal axis represents a rotational phase [deg], and the vertical axis represents rotational torque [N·m]. FIG. 9 show the torque fluctuation occurring in the first compression unit 10, the torque fluctuation occurring in the second compression unit 20, and total torque obtained by superposing the torque fluctuations occurring in the first compression unit 10 and the second compression unit 20.

During the single operation, the first compression unit 10 causes the torque fluctuation in which a peak is observed at a vicinity of a rotational phase of 180 degrees. Further, the torque fluctuation occurring in the second compression unit 20 brought into the non-compression state is smaller than the torque fluctuation occurring in the first compression unit 10 brought into the compression state. The total torque has a torque fluctuation in which one large convex profile (having a torque fluctuation range of 120 [N·m]) is observed in one cycle nearly similarly to the torque fluctuation occurring in the first compression unit 10.

On the other hand, during the parallel operation, the torque fluctuation in which the peak is observed at the vicinity of the rotational phase of 180 degrees occurs in the first compression unit 10, and the torque fluctuation in which a peak is observed at a vicinity of a rotational phase of 0 degrees occurs in the second compression unit 20 having an opposite phase. When superposing the torque fluctuations, the torque fluctuations cancel out each other. Accordingly, the total torque has a torque fluctuation in which two small convex profiles having a fluctuation range of about 40 [N·m] are observed in one cycle.

When the torque waveforms are subjected to a Fast Fourier Transform (FFT) analysis and comparison is made on intensities of respective frequency components (square of a torque value), an operating frequency (1f) component is dominant in a case of the single operation, and a double frequency (2f) component is dominant during the parallel operation.

In a case of the six-pole motor, the single operation and the parallel operation are common in that a current waveform of the motor has three convex profiles in one cycle. Basically, a current value is proportional to the above-mentioned total torque, and hence different characteristics are observed in the current waveforms of the motor in the single operation and the parallel operation. Now, this point is described.

Figure 10:
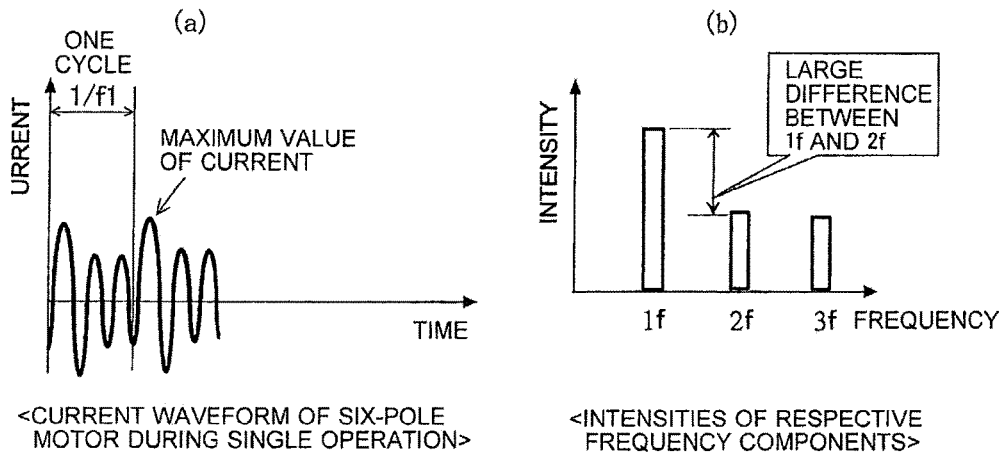

FIG. 10 are graphs showing characteristics during the single operation when the electric motor 8 of the two-cylinder rotary compressor 100 of FIG. 7 is a six-pole motor. FIG. 10(*a*) is a graph showing a current waveform of the motor, and FIG. 10(*b*) is a graph showing intensities of respective frequency components. The horizontal axis of FIG. 10(*a*) represents time, and the vertical axis thereof represents a current. The horizontal axis of FIG. 10(*b*) represents frequency, and the vertical axis thereof represents intensity.

During the single operation, such a characteristic is observed that, among three convex profiles, a first convex profile is larger than a second convex profile and a third convex profile. In addition, when the current waveforms are subjected to the FFT analysis and comparison is made on the intensities of the respective frequency components (square of a current amplitude), such a characteristic is observed during the single operation that the intensity of the basic operating frequency (1f) component is about double the intensity of the double frequency (2f) component.

Figure 11:
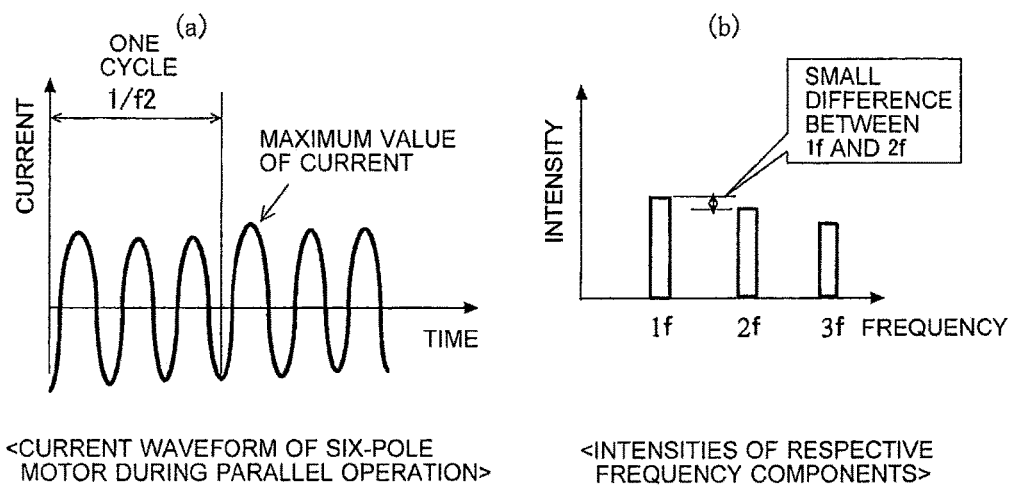

FIG. 11 are graphs showing characteristics during the parallel operation when the electric motor 8 of the two-cylinder rotary compressor 100 of FIG. 7 is a six-pole motor. FIG. 11(*a*) is a graph showing a current waveform of the motor, and FIG. 11(*b*) is a graph showing intensities of respective frequency components. The horizontal axis of FIG. 11(*a*) represents time, and the vertical axis thereof represents a current. The horizontal axis of FIG. 11(*b*) represents frequency, and the vertical axis thereof represents intensity.

During the parallel operation, such a characteristic is observed that a difference among the three convex profiles is small. In addition, when comparison is made on the intensities of the respective frequency components based on the FFT analysis, it is understood that a difference between the basic operating frequency (1f) component and the double frequency (2f) component is small.

As described above, the current waveform of the motor varies depending on whether the operation mode is the single operation or the parallel operation. Accordingly, the operation mode detecting-determining unit 145 can determine the operation mode by observing the current waveform of the motor. For example, the following determination method is used. Specifically, the intensity of the 1f component and the intensity of the 2f component are compared to each other. When the 1f component is equal to or 1.5 times larger than the 2f component, it is determined that the operation mode is the single operation. When the 1f component is equal to or 1.3 times smaller than the 2f component, it is determined that the operation mode is the parallel operation. When the 1f component is 1.3 times larger than the 2f component and 1.5 times smaller than the 2f component, determination of the operation mode is temporarily reserved and detection of a current form is continued. At the point in time when the 1f component reaches the above-mentioned threshold values (that is, at the point in time when the 1f component is equal to or 1.3 times smaller than the 2f component, or equal to or 1.5 times larger than the 2f component), the operation mode can be determined.

Next, an operation controlling method accompanied with switching of the operation mode is described while exemplifying an operation pattern at the time of heating.

(1) Switching from Single Operation to Parallel Operation at the Time of Startup In a case of starting heating when the outside temperature and the indoor temperature are low, an operation is started under a small pressure difference (Pd–Ps) at low torque and low speed, and a discharge temperature (condenser temperature), torque, and the operating frequency are gradually increased. When the pressure difference (Pd–Ps) is increased to a certain level or more, the two-cylinder rotary compressor 100 is automatically switched to the parallel operation. The operation mode detecting-determining unit 145 determines that the operation mode is the parallel operation, and outputs the result of determination to the heat pump capacity control device 160. The temperature difference detecting unit 163 of the heat pump capacity control device 160 detects a temperature difference between an actual value of the room temperature detected by the indoor temperature sensor 172 and a target value of the room temperature set by the target room temperature setting device 171. Then, based on the temperature difference, the result that the current operation mode is the parallel operation, and the temperatures output from the heat exchanger temperature sensors 173a and 173b, the operating frequency setting unit 161 calculates (determines) an operating frequency suitable for achieving the target value of the room temperature. The command signal is transmitted from the signal output unit 162 to the inverter drive circuit 152 so as to cause the electric motor 8 to act at the determined operating frequency.

(2) Rated Heating Operation when Room Temperature is Increased

Next, when operation states of components of the units are stabilized, in order to increase the room temperature to the target value of the room temperature at full power, rated heating operation is performed under a large pressure difference at high torque and high speed, and the parallel operation is continued.

(3) Medium Heating Operation when Room Temperature Reaches Target Temperature

When the room temperature reaches the target value of the room temperature, in order to reduce heating capacity by half and to control the room temperature, the medium heating operation is performed under a medium pressure difference at medium torque and medium speed, and the parallel operation is continued.

(4) Minimum Heating Operation when Room Temperature Reaches Target Temperature

Further, in a case of a highly air-tightened and highly heat-insulated room, when a temperature in the entire room approaches to the target value of the room temperature, a heat load resulting from entry of heat is satisfactorily small. Thus, minimum heating operation is performed at a minimum operating frequency and low torque. At this time, the pressure difference (Pd–Ps) is equal to or smaller than the certain level, and hence the two-cylinder rotary compressor 100 is automatically switched to the single operation. Also in this case, after the operation mode detecting-determining unit 145 determines that the operation mode is the single operation, the difference between the actual value of the room temperature detected by the indoor temperature sensor 172 and the target value of the room temperature set by the target room temperature setting device 171 is detected, and the operating frequency suitable for achieving the target room temperature is determined. Further, the command signal is transmitted from the signal output unit 162 to the inverter drive circuit 152 so as to cause the electric motor 8 to act at the determined operating frequency.

When the compression units 10 and 20 of the two-cylinder rotary compressor 100 are switched between the single operation and the parallel operation as described in the items (1) to (4), the heat pump capacity control device 160 needs to perform control in the following manner. That is, the heat pump capacity control device 160 needs to control an output current of the inverter circuit 151 so as to attain a nearly equal value of load processing capacity (heating capacity or cooling capacity) of the heat pump apparatus 200 in the single operation and the parallel operation (that is, so as to prevent a change of load processing capacity).

In general, the single operation is performed at an operating frequency (which is synonymous with a rotating frequency) substantially twice that of the parallel operation, thereby attaining such characteristics that the refrigerant gas compressed in the cylinder chamber leaks less in the single operation than in the parallel operation. Accordingly, volumetric efficiency $\eta v1$ in the single operation is higher than volumetric efficiency $\eta v2$ in the parallel operation. Thus, when the operation mode is switched from the parallel operation to the single operation, in order to maintain equal cooling capacity or heating capacity, that is, to maintain an equal refrigerant circulation amount, the operating frequency f1 during the single operation (corresponding to an output frequency of the inverter drive control device 150 and a rotating frequency of the electric motor 8) needs to satisfy the following relationship.

$$f1 = f2 \times 2 \times \eta v2 / \eta v1$$

Normally, the difference between the volumetric efficiency $\eta v2$ and the volumetric efficiency $\eta v1$ is approximately 20% at a maximum. The operation may be performed so that the operating frequency f1 is set in the following operating frequency range obtained by subtracting the difference from the double of the operating frequency f2 during the parallel operation.

$$f2 \times 2 > f1 > f2 \times 2 \times 0.8$$

Conversely, when the operation mode is switched from the single operation to the parallel operation, the operation may be performed so that the operating frequency f2 during the parallel operation is set in the following operating frequency range so as to be slightly higher than half of the operating frequency during the single operation.

$$f1 \times 1.2 \times 1/2 > f2 > f1 \times 1/2$$

Further, as shown in the torque fluctuations of FIG. 9, an effective value of the torque during the single operation is reduced to approximately half of an effective value during the parallel operation, whereas a torque fluctuation range during the single operation is increased to approximately triple of a torque fluctuation range during the parallel operation. Accordingly, a drive current waveform during the single operation (FIG. 10) has such a characteristic that the 1f component is significantly larger than the 2f component and the 3f component.

Based on the above-mentioned characteristic at the time of switching the operation mode, when switching the operation mode from the single operation to the parallel operation in inverter drive control, frequency of a drive current to be supplied during the parallel operation (FIG. 11) sharply drops, and an effective value of the current is increased to approximately double of an effective value of the current during the single operation. However, a maximum current value is nearly equal to that during the single operation (FIG. 10), and the maximum current value has a relatively gentle slope in the convex profile. An operating frequency of the drive current to be supplied is reduced, and a fluctuation rate at the maximum current is low. Thus, the switching is performed relatively safely.

On the other hand, when switching the operation mode from the parallel operation to the single operation, the maximum current value has a relatively steep slope in the convex profile, the operating frequency of the drive current to be supplied is increased, and the fluctuation rate at the maximum current is relatively high. Accordingly, there is a fear in that an overcurrent occurs. In view of safety, an adjustment method of gently increasing the current is employed in the heat pump capacity control device 160.

<Effects of the Present Invention>

As described above, according to the heat pump apparatus 200 of Embodiment 1, it is possible to promptly determine whether the operation mode is the single operation or the parallel operation. Thus, the output frequency of the inverter circuit 151 necessary for achieving the target temperature can be uniquely determined, and the refrigeration cycle can be stably controlled. Further, the heat pump apparatus 200 according to Embodiment 1 includes the two-cylinder rotary compressor 100 having the retaining mechanism. Thus, at a vicinity of a point in time when switching the operation mode, the operation state can be stabilized between the compression state and the non-compression state.

Further, an electromagnetic pressure switching unit such as the four-way valve and a pipe for leading a switched pressure are not needed outside the closed shell 3. Accordingly, upsizing and cost increase can be minimized.

Owing to the above-mentioned effects, a compressor loss can be reduced under a low-load condition, and enhancement of efficiency of the compressor and increase of a capacity range can be achieved, thereby being capable of enhancing energy-saving performance in actual load operation.

Further, in Embodiment 1, description is made of the method of comparing the current waveforms of the motor having three convex profiles in one cycle, and the intensities of the respective frequency components when the electric motor 8 of the two-cylinder rotary compressor 100 is the six-pole motor. A four-pole motor is different in that a current waveform of the motor has two convex profiles in one cycle, but has such a characteristic that, out of the two convex profiles, a first convex profile is larger than a second convex profile during the single operation. In addition, when the current waveform is subjected to the FFT analysis and comparison is made on intensities of respective frequency components (square of a current amplitude), such a characteristic is observed during the single operation that intensity of a basic operating frequency (1f) component is larger than that of a double frequency (2f) component. Accordingly, similarly to the case of the six-pole motor, it is possible to promptly determine whether the operation mode is the single operation or the parallel operation, and hence the same effects can be attained.

Embodiment 2

Embodiment 2 is different from Embodiment 1 in a method of determining the operation mode. Now, Embodiment 2 according to the present invention is described with reference to the drawings. Note that, in the following, differences of Embodiment 2 from Embodiment 1 are mainly described.

<Characteristic Configuration of Two-cylinder Rotary Compressor 100 of Embodiment 2>

Figure 12:
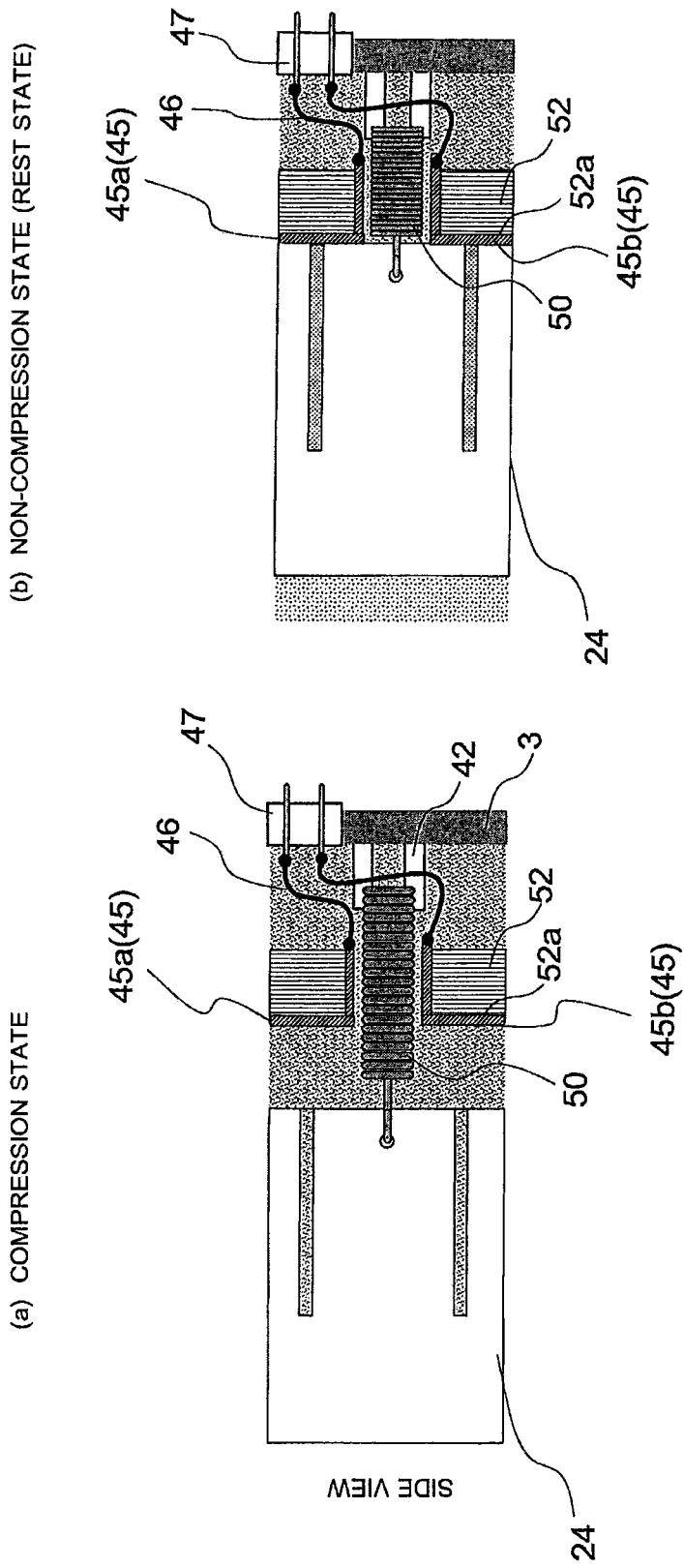

FIG. 12 are schematic side views of a retaining mechanism of the two-cylinder rotary compressor 100 arranged in the heat pump apparatus 200 according to Embodiment 2 of the present invention. FIG. 12(a) is a view illustrating the compression state, and FIG. 12(b) is a view illustrating the non-compression state (rest state).

The contact component 52, with which the second vane 24 of the second compression unit 20 is brought into contact, is formed of a magnet, and a magnetized conduction plate 45 that is magnetized is mounted on the contact component 52. The magnetized conduction plate 45 is connected through conduction wires 46 to a pair of hermetic terminals (two-phase terminals) 47 mounted to the closed shell 3. The magnetized conduction plate 45 is divided into an upper magnetized conduction plate 45a and a lower magnetized conduction plate 45b across the tension spring 50. In the compression state, the upper magnetized conduction plate 45a and the lower magnetized conduction plate 45b are brought into a non-conduction state. In the non-compression state, the second vane 24 is stopped while attracted to the contact component 52, and the upper magnetized conduction plate 45a and the lower magnetized conduction plate 45b are brought into a conduction state through the contact component 52 and the second vane 24. Further, a conduction signal indicating conduction between the pair of hermetic terminals (two-phase terminals) 47 is output to the operation mode detecting-determining unit 145. A switching unit according to the present invention includes the magnetized conduction plate 45.

<Feature of Method of Controlling Heat Pump Apparatus 200 of Embodiment 2>

Figure 13:
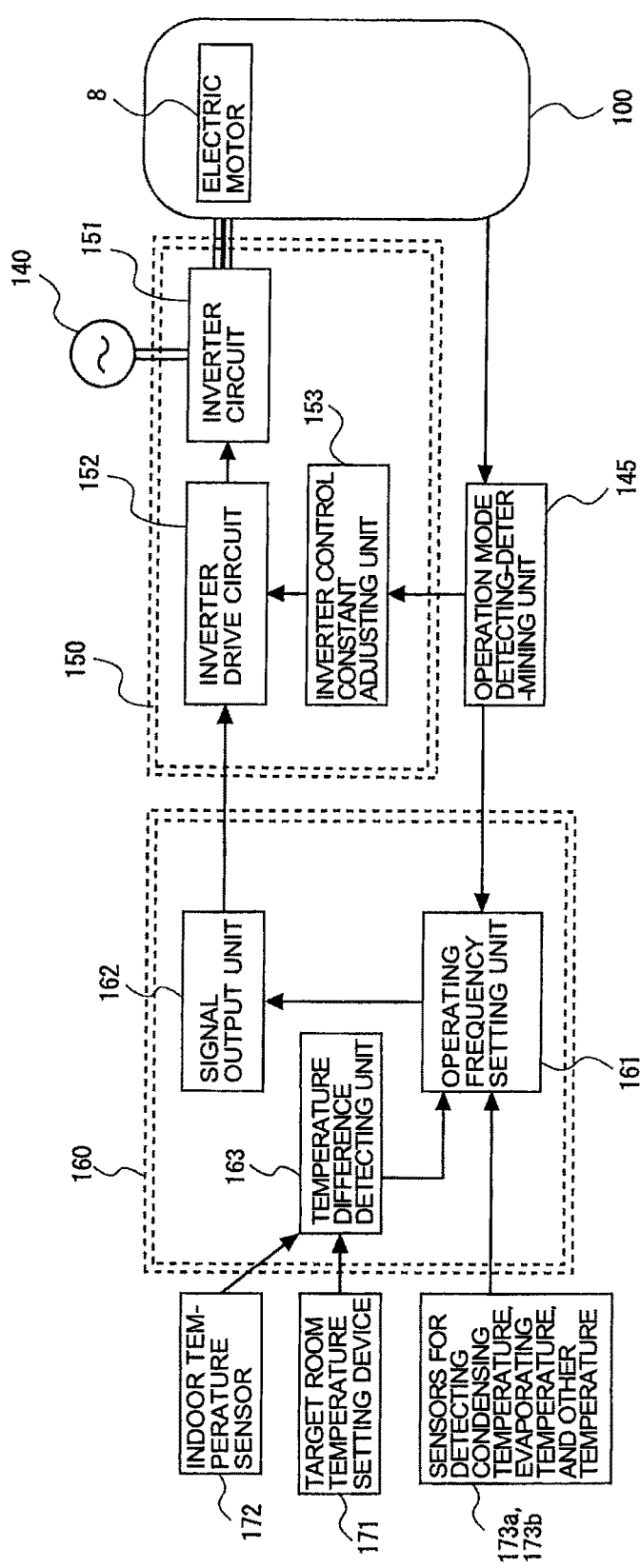
FIG. 13 is a schematic view illustrating a control circuit of the heat pump apparatus 200 according to Embodiment 2 of the present invention.

FIG. 13 is a schematic view illustrating a control circuit of the heat pump apparatus 200 according to Embodiment 2 of the present invention.

When detecting conduction between the pair of hermetic terminals (two-phase terminals) 47 by acquiring the conduction signal, the operation mode detecting-determining unit 145 arranged outside the closed shell 3 determines that the heat pump apparatus 200 is in the non-compression state (single operation). When acquiring no conduction signal to detect non-conduction, the operation mode detecting-determining unit 145 determines that the heat pump apparatus 200 is in the compression state (parallel operation).

Subsequently, similarly to Embodiment 1, the heat pump apparatus 200 is controlled using the inverter drive control device 150 and the heat pump capacity control device 160.

<Effects of the Present Invention>

As described above, according to Embodiment 2, the same effects as those of Embodiment 1 can be attained. That is, the compressor loss can be reduced under a low-load condition, and the enhancement of the efficiency of the compressor and the increase of the capacity range can be achieved, thereby being capable of enhancing the energy-saving performance in the actual load operation.

Embodiment 3

Embodiment 3 is different from Embodiment 1 in a method of determining the operation mode. Now, Embodiment 3 according to the present invention is described with reference to the drawings. Note that, in the following, differences of Embodiment 3 from Embodiment 1 are mainly described.

<Method of Determining Operation Mode>

A principle of determining the operation mode by the operation mode detecting-determining unit 145 according to Embodiment 3 is described.

Figure 14:
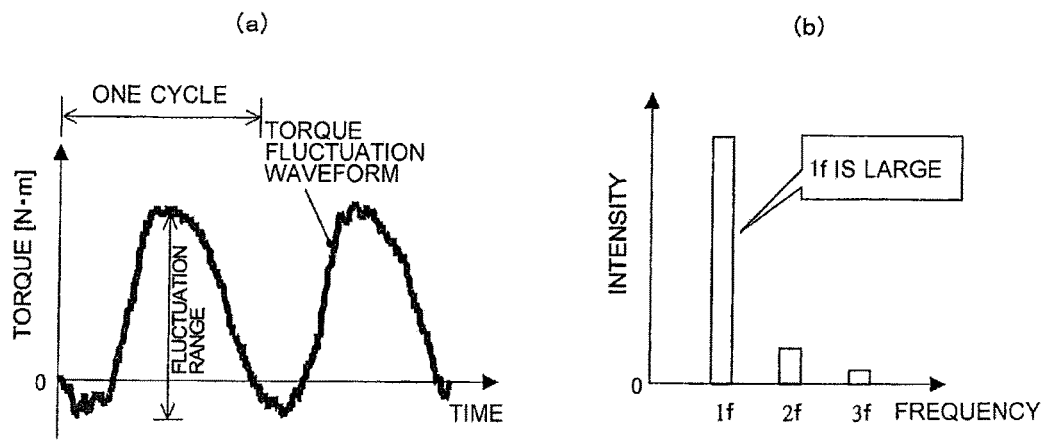
Figure 15:
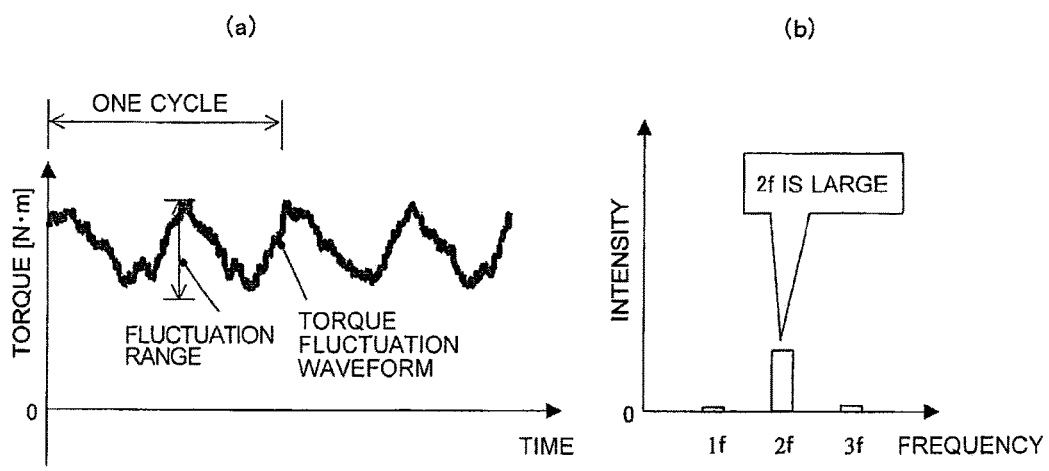

FIG. 14 are graphs showing characteristics during the single operation of the two-cylinder rotary compressor 100 of FIG. 7. More specifically, FIG. 14(a) is a graph showing a waveform obtained by calculating a torque fluctuation during the single operation based on the current waveform of the inverter output (FIG. 10(a)). FIG. 14(b) is a bar graph showing intensities of respective frequency components (square of a torque value) obtained by subjecting this torque fluctuation waveform to the FFT analysis. Similarly, FIG. 15 are graphs showing characteristics during the parallel operation of the two-cylinder rotary compressor 100 of FIG. 7. More specifically, FIG. 15(a) is a graph showing a waveform obtained by calculating a torque fluctuation during the parallel operation based on the current waveform of the inverter output (FIG. 11(a)). FIG. 15(b) is a bar graph showing intensities of respective frequency components (square of a torque value) obtained by subjecting this torque fluctuation waveform to the FFT analysis. In FIG. 14(a) and FIG. 15(a), the horizontal axis represents time, and the vertical axis represents torque [N·m]. In FIG. 14(b) and FIG. 15(b), the horizontal axis represents a frequency, and the vertical axis represents intensity.

In a case of the single operation as shown in FIG. 14(b), a primary component (1f) corresponding to the operating frequency is maximum. On the other hand, in a case of the parallel operation as shown in FIG. 15(b), a secondary component (2f) corresponding to the double of the operating frequency is maximum. As described above, it is possible to determine whether the operation mode is the single operation or the parallel operation through comparison of the result of the FFT analysis on the calculated torque fluctuation waveform.

In Embodiment 1, the FFT analysis is directly conducted on the current waveform of the inverter output, and the intensities of the respective frequency components are analyzed. In this manner, whether the operation mode is the single operation or the parallel operation is determined. On the other hand, in Embodiment 3, after the current waveform of the inverter output is converted into the torque fluctuation waveform, the FFT analysis is conducted on the current waveform of the inverter output, and the intensities of the respective frequency components are analyzed. Thus, a difference between the single operation and the parallel operation can be more clearly determined.

Further, the difference between the single operation and the parallel operation is apparent from the calculated torque fluctuation waveforms themselves (FIG. 14(a) and FIG. 15(a)). Accordingly, the operation mode can be determined relatively easily by measuring and comparing maximum values and minimum values of the torque fluctuation waveforms without conducting the FFT analysis.

For example, the single operation has a characteristic of having a range where the torque is negative, but the parallel operation has such characteristics that the minimum value of the torque fluctuation waveform is positive, and that a ratio between the maximum value and the minimum value is approximately double. Accordingly, whether the operation mode is the single operation or the parallel operation can be determined easily based on the difference in characteristics.

Alternatively, the maximum value and the minimum value are shown at one-cycle intervals during the single operation, whereas the maximum value and the minimum value are shown at half-cycle intervals during the parallel operation. Accordingly, the operation mode can also be determined based on the difference in time intervals.

<Effects of the Present Invention>

As described above, according to Embodiment 3, the same effects as those of Embodiment 1 can be attained. That is, the compressor loss can be reduced under a low-load condition, and the enhancement of the efficiency of the compressor and the increase of the capacity range can be achieved, thereby being capable of enhancing the energy-saving performance in the actual load operation. Further, in Embodiment 3, whether the operation mode is the single operation or the parallel operation is determined based on the torque fluctuation waveforms. Thus, as compared to Embodiment 1, the operation mode can be determined more clearly.

<Supplementary Description>

In Embodiment 1 or 2, description is made of the heat pump apparatus using the two-cylinder compressor of a closed high-pressure shell type (in which the compression units and the electric motor are arranged in the closed shell under the same discharge pressure). However, also in another shell type, the same effects can be attained using the same unit. For example, the same effects can be attained even in a case of a semi-closed type. Further, the same effects can be attained even in a case of a medium-pressure shell type or a low-pressure shell type.

Further, the control method performed by detecting and determining the operation mode, and the mechanism for keeping the non-compression state of separating the vane from the compression chamber side, which are described in Embodiment 1 and Embodiment 2, are applicable to a rotary compressor of another type except for the above-mentioned rolling piston type. For example, instead of the two-cylinder rolling piston type, there may be employed rotary compressor types such as a two-cylinder rocking piston type in which a vane and a piston are separable from each other (are not integrated with each other), a two-cylinder rotary vane type, and a two-vane rotary vane type. Even when the control method performed by detecting and determining the operation mode according to Embodiment 2 is employed to the compressors of those types, it is possible to attain effects corresponding to the effects obtained when the control method is employed for the above-mentioned two-cylinder compressor of the rolling piston type.

For example, a compression unit of a rocking piston type capable of separating a vane is disclosed in Patent Literature 4. The present invention corresponds to a case of forming the compression unit into two cylinders, and enabling one of the two cylinders to be switched to a non-compression state. Alternatively, a compression unit of a two-vane rotary vane type is disclosed in Patent Literature 5. The present invention corresponds to a case of separating one of two vanes and enabling one of the two vanes to be switched to a non-compression state. Further, the present invention corresponds to a case of forming the compression unit of the two-vane rotary vane type disclosed in Patent Literature 5 into two upper and lower cylinders, and enabling one of the two cylinders to be switched to a non-compression state.

Application of the control method performed by detecting and determining the operation mode according to Embodiment 1 or Embodiment 2 is not limited to the above-mentioned two-cylinder rotary compressor of the rolling piston type. When a mechanism for switching the operation mode between the single operation and the parallel operation depending on a load condition is provided in a two-cylinder compressor including two compression units, the control method is applicable to another compression type. For example, the control method may be applied to, instead of the two-cylinder rolling piston type, a rotary compression type (such as a rocking piston type or a rotary vane type) in which two compression units are arranged in two cylinders or one cylinder, a scroll compression type having two scroll compression units, or a two-cylinder reciprocating compressor. When the control method is employed in those positive displacement compressors, for example, a valve opening/closing mechanism is arranged on a suction side of one of the two compression units. With this configuration, the valve is closed under a low-load condition involving a small pressure difference between the suction pressure (Ps) and the discharge pressure (Pd), and one of the compression units can be kept in the non-compression state. Accordingly, a capacity control device implemented by the operation mode detecting-determining unit according to Embodiment 1 or Embodiment 2 is applicable. In this case, the valve opening/closing mechanism is added, but there is no switching circuit for changing a leading pressure as disclosed in Patent Literature 1 or Patent Literature 2. This leads to simpler circuit, and provides an effect of reducing the size as compared to the compressor disclosed in Patent Literature 1 or Patent Literature 2. However, the size is increased as compared to the two-cylinder rolling piston type described in Embodiment 1 or Embodiment 2, which brings a small improving effect.

In Embodiment 1 and Embodiment 2, as the pulling force, the elastic force exerted by the tension spring 50 and the magnetic force exerted by the magnet are exemplified, but also an inertial force (centrifugal force) may be employed. That is, the second vane 24 is movable in the vane groove 29 only by the pressure difference between the "suction pressure applied to the distal end portion 24a of the second vane 24" and the "discharge pressure applied to the rear end portion 24b of the second vane 24". Accordingly, even when the tension spring 50 is not arranged in the second compression unit 20 of the two-cylinder rotary compressor 100 described in Embodiment 1 or Embodiment 2, the present invention can be carried out.

When the first compression unit 10 compresses the refrigerant, under a state in which the distal end portion 14a of the first vane 14 is pressed against the outer peripheral wall of the first piston 13, the first vane 14 is moved in the vane groove 19 while following the eccentric rotary motion of the first piston 13. Similarly, when the second compression unit 20 compresses the refrigerant, under a state in which the distal end portion 24a of the second vane 24 is pressed against the outer peripheral wall of the second piston 23, the second vane 24 is moved in the vane groove 29 while following the eccentric rotary motion of the second piston 23. That is, when the first compression unit 10 and the second compression unit 20 compress the refrigerant, along with the eccentric rotary motions of the first piston 13 and the second piston 23, the centrifugal force acting as the pulling force is applied to the first vane 14 and the second vane 24.

Accordingly, when the pressing force caused by the pressure difference between the "suction pressure applied to the entire distal end portion 24a of the second vane 24" and the "discharge pressure applied to the entire rear end portion 24b of the second vane 24" exceeds the pulling force generated by the centrifugal force, the distal end portion 24a of the second vane 24 is pressed against the outer peripheral wall of the second piston 23, and the second compression unit 20 performs the refrigerant compressing action.

On the other hand, when the pressure (discharge pressure) in the internal space 7 of the closed shell 3 is reduced, the pulling force generated by the centrifugal force exceeds the pressing force caused by the pressure difference between the "suction pressure applied to the entire distal end portion 24a of the second vane 24" and the "discharge pressure applied to the entire rear end portion 24b of the second vane 24", and the second vane 24 is separated away from the outer peripheral wall of the second piston 23, with the result that the second compression unit 20 is brought into the rest state (non-compression state). Then, when the second vane 24 is further moved in a direction away from the outer peripheral wall of the second piston 23, the rear end portion 24b of the second vane 24 is stably retained in the same manner as the above.

In Embodiment 1 or Embodiment 3, on the assumption that the two-cylinder compressor includes a mechanism for passively switching the operation mode between the single operation and the parallel operation depending on a load condition, description is made of the operation mode detecting-determining unit for determining the current operation mode based on the electric signal acquired from the inverter drive control device that supplies drive power to the electric motor. However, application of the operation mode detecting-determining unit according to the present invention is not limited to the above-mentioned two-cylinder compressor, and the operation mode detecting-determining unit is also effective in the following two-cylinder compressor. That is, a pressure in a cylinder chamber and a pressure on a vane back surface are switched using an electromagnetic switching valve as disclosed in Patent Literature 1 or Patent Literature 2. In this manner, also in a two-cylinder compressor that actively switches the operation mode, the operation mode detecting-determining unit according to the present invention is effective as an auxiliary unit for confirming whether the current operation mode is the single operation or the parallel operation.

REFERENCE SIGNS LIST

2 compressor discharge pipe 3 closed shell 3a lubricating oil storage portion 4 intermediate partition plate 5 drive shaft 5a long shaft portion 5b short shaft portion 5c eccentric pin shaft portion 5d eccentric pin shaft portion 5e intermediate shaft portion 6 suction muffler 6a inflow pipe 6b container 6c outflow pipe 6d outflow pipe 7 internal space 7cc displacement volume 8 electric motor 8a rotor 8b stator 9 hermetic terminal (three-phase terminal) 10 first compression unit 11 first cylinder 12 first cylinder chamber 12a suction chamber 12b compression chamber 13 first piston 14 first vane 14a distal end portion 14b rear end portion 15 vane back chamber 17 cylinder suction passage 18 discharge port 18a on-off valve 19 vane groove 20 second compression unit 21 second cylinder 22 second cylinder chamber 23 second piston 24 second vane 24a distal end portion 24b rear end portion 25 vane back chamber 27 cylinder suction passage 28 discharge port 28a on-off valve 29 vane groove 30 passage 40 compression spring 42 spring fixing portion 45 magnetized conduction plate 45a upper magnetized conduction plate 45b lower magnetized conduction plate 46 conduction wire 47 hermetic terminal (two-phase terminal) 50 tension spring 51a communication hole 51b communication hole 52 contact component 52a flat surface portion (vane contact surface) 53 communication hole 60 first support member 60a bearing portion 60b flange portion 63 discharge muffler 70 second support member 70a bearing portion 70b flange portion 73 discharge muffler 99 compression mechanism 100 two-cylinder rotary compressor 140 AC power source 145 operation mode detecting-determining unit 150 inverter drive control device 151 inverter circuit 152 inverter drive circuit 153 inverter control constant adjusting unit 160 heat pump capacity control device (capacity control device) 161 operating frequency setting unit 162 signal output unit 163 temperature difference detecting unit 171 target room temperature setting device 172 indoor temperature sensor 173a heat exchanger temperature sensor 173b heat exchanger temperature sensor 200 heat pump apparatus 201 four-way valve 201a heating-operation channel 201b cooling-operation channel 202 indoor-side heat exchanger 203 pressure reducing mechanism 204 outdoor-side heat exchanger 207 refrigerant circuit pipe A outdoor space B indoor space

The invention claimed is:
1. A heat pump apparatus, comprising:
a two-cylinder compressor including
an electric motor, and
two compression units to be driven by the electric motor,
the two-cylinder compressor being structured to switch between two operation modes including a single operation in which one of the two compression units is brought into a non-compression state, and a parallel operation in which both of the two compression units are brought into a compression state in accordance with operation conditions,
a heat-rejecting-side heat exchanger;
an expansion valve;
a heat-removing-side heat exchanger,
the two-cylinder compressor, the heat-rejecting-side heat exchanger, the expansion valve, and the heat-removing-side heat exchanger being connected to one another;
a controller configured to,
supply drive power to the electric motor of the two-cylinder compressor;
identify which one of the two operation modes is currently operating based on an electric signal acquired from an inverter drive control device; and
determine rotating frequency of the electric motor based on a result of determination of an operation mode detecting-determining unit so that a temperature of a target object is brought close to a set value, to control the inverter drive control device, and
a closed container into which the electric motor and the two compression units are inserted,
wherein the two-cylinder compressor passively switches an operation mode between the two operation modes when a pressure within the closed container changes in accordance with the operation conditions.
2. The heat pump apparatus of claim 1, wherein the controller is further configured to,
determine that the operation mode is the single operation when a primary component of the rotating frequency of the electric motor is dominant in frequency components of a current waveform of a drive current supplied from the inverter drive control device to the electric motor.
3. The heat pump apparatus of claim 1, wherein the controller is further configured to,
determine that the operation mode is the single operation when a primary component of the rotating frequency of the electric motor is dominant in frequency components of a torque fluctuation waveform calculated based on a drive current supplied from the inverter drive control device to the electric motor.
4. The heat pump apparatus of claim 1,
wherein at least one of the two compression units of the two-cylinder compressor includes,
a cylinder having a cylindrical cylinder chamber formed therein,
a piston arranged on an eccentric shaft portion of a drive shaft of the electric motor, and configured to perform eccentric rotary motion in the cylindrical cylinder chamber, and
a vane slidably arranged so that a distal end portion of the vane abuts on the piston, the vane partitioning the cylindrical cylinder chamber into two spaces,
wherein the at least one of the two compression units is constructed in a rotary compressor type so that a suction pressure is applied to the distal end portion of the vane, whereas a pressure of refrigerant discharged from the two compression units is applied to a rear end portion of the vane, that a pulling force is also applied to the vane in a direction of moving the vane to the rear end portion side, and that in accordance with the operation conditions, an operation state is switched between the compression state in which the distal end portion of the vane is held in contact with the piston, and the non-compression state in which the distal end portion of the vane is separated away from the piston, and
wherein the one of the two compression units includes a contact component arranged on a surface of the vane for retaining the vane while being in contact with the vane when the vane is separated away from the piston.
5. The heat pump apparatus of claim 4, wherein the pulling force comprises any one of an elastic force, an inertial force, and a magnetic force.
6. The heat pump apparatus of claim 1, wherein the controller is further configured to,
when detecting switching of the operation mode based on the result of determination, determine the rotating frequency of the electric motor so that cooling capacity or heating capacity of the heat pump apparatus has an equal value before and after the switching of the operation mode, to thereby control the inverter drive control device.
7. The heat pump apparatus of claim 6,
wherein the controller is further configured to,
when switching the operation mode from the single operation to the parallel operation, control the rotating frequency so as to aim the rotating frequency greater than 50% of the rotating frequency during the single operation before the switching, and
when switching the operation mode from the parallel operation to the single operation, control the rotating frequency so as to aim the rotating frequency less than 200% of the rotating frequency during the parallel operation before the switching.
8. The heat pump apparatus of claim 6, wherein the controller is further configured to,
when switching the operation mode from the parallel operation to the single operation, set a target of the drive current so that a maximum value of the drive current supplied to the electric motor is temporarily smaller than a maximum value during the parallel operation.

9. The heat pump apparatus of claim 2, wherein the controller is further configured to,
apply an FFT analysis to the current waveforms and calculates intensities of the frequency components.

10. The heat pump apparatus of claim 3, wherein the controller is further configured to,
apply an FFT analysis to the torque waveforms and calculates intensities of the frequency components.

11. A heat pump apparatus, comprising:
a two-cylinder compressor including
an electric motor, and
two compression units to be driven by the electric motor,
the two-cylinder compressor being structured to switch between a single operation in which one of the two compression units is brought into a non-compression state, and a parallel operation in which both of the two compression units are brought into a compression state,
a heat-rejecting-side heat exchanger;
an expansion valve;
a heat-removing-side heat exchanger,
the two-cylinder compressor, the heat-rejecting-side heat exchanger, the expansion valve, and the heat-removing-side heat exchanger being connected to each other,
at least one of the two compression units of the two-cylinder compressor includes,
a cylinder having a cylindrical cylinder chamber formed therein,
a piston arranged on an eccentric shaft portion of a drive shaft of the electric motor, and configured to perform eccentric rotary motion in the cylindrical cylinder chamber, and
a vane slidably arranged so that a distal end portion of the vane abuts on the piston, the vane partitioning the cylindrical cylinder chamber into two spaces; and
a controller configured to,
supply drive power to the electric motor of the two-cylinder compressor;
output a conduction signal of a switch under a state in which the distal end portion of the vane of the at least one of the two compression units is separated away from the piston and the vane is stopped;
identify that a current operation mode is the single operation when acquiring the conduction signal output from the switch, and identifies that the current operation mode is the parallel operation when acquiring no conduction signal; and
control output frequency of an inverter drive control device based on a result of identifying so that a temperature of an object is brought close to a set value, and
a closed container into which the electric motor and the two compression units are inserted,
wherein the two-cylinder compressor passively switches an operation mode between the two operation modes when a pressure within the closed container changes in accordance with operation conditions.

\* \* \* \* \*